(12) United States Patent
Loheide et al.

(10) Patent No.: US 11,019,398 B2
(45) Date of Patent: May 25, 2021

(54) PUBLISHING DISPARATE LIVE MEDIA OUTPUT STREAMS USING LIVE INPUT STREAMS

(71) Applicant: Turner Broadcasting Systems, Inc., Atlanta, GA (US)

(72) Inventors: Donald Jude Loheide, Mableton, GA (US); Nishith Kumar Sinha, Mableton, GA (US); Nicolas Paul Webb, McDonough, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

(21) Appl. No.: 16/229,497

(22) Filed: Dec. 21, 2018

(65) Prior Publication Data
US 2019/0141394 A1    May 9, 2019

Related U.S. Application Data

(63) Continuation-in-part of application No. 15/396,475, filed on Dec. 31, 2016.
(Continued)

(51) Int. Cl.
*H04N 21/458*    (2011.01)
*H04N 21/2187*    (2011.01)
(Continued)

(52) U.S. Cl.
CPC ....... *H04N 21/458* (2013.01); *H04N 21/2187* (2013.01); *H04N 21/262* (2013.01);
(Continued)

(58) Field of Classification Search
CPC ............... H04N 21/458; H04N 21/262; H04N 21/44222
See application file for complete search history.

(56) References Cited

U.S. PATENT DOCUMENTS

| | | |
|---|---|---|
| 3,751,581 A | 8/1973 | Sakata et al. |
| 4,500,930 A | 2/1985 | Hamalainen et al. |
| | (Continued) | |

OTHER PUBLICATIONS

Advisory Action for U.S. Appl. No. 15/396,475 dated Jun. 3, 2019.
(Continued)

*Primary Examiner* — Chenea Davis
(74) *Attorney, Agent, or Firm* — Chip Law Group

(57) ABSTRACT

A live media content switching system receives a plurality of live input streams associated with a plurality of live input stream manifests. One or more events in a first live input stream manifest of the plurality of live input stream manifests are identified. The first live input stream manifest is associated with a first live input stream of the plurality of live input streams being viewed at a consumer device. Based on the identification, information related to a plurality of first media segments and the one or more events from the first live input stream indicated in the first live input stream manifest is inserted into a first disparate live media output stream manifest based on a programming schedule. The first disparate live media output stream of a plurality of disparate live media output streams is published for the consumer device based on the first live input stream manifest.

45 Claims, 8 Drawing Sheets

Related U.S. Application Data

(60) Provisional application No. 62/699,131, filed on Jul. 17, 2018.

(51) Int. Cl.
    *H04N 21/4627*    (2011.01)
    *H04N 21/262*     (2011.01)
    *H04N 21/442*     (2011.01)
    *H04N 21/2668*    (2011.01)
    *H04N 21/845*     (2011.01)

(52) U.S. Cl.
    CPC ... *H04N 21/2668* (2013.01); *H04N 21/44222* (2013.01); *H04N 21/4627* (2013.01); *H04N 21/8456* (2013.01)

(56) References Cited

U.S. PATENT DOCUMENTS

| | | |
|---|---|---|
| 5,294,981 A | 3/1994 | Yazolino et al. |
| 6,229,524 B1 | 5/2001 | Chernock et al. |
| 6,378,129 B1 | 4/2002 | Zetts |
| 6,434,621 B1 | 8/2002 | Pezzillo et al. |
| 6,625,811 B1 | 9/2003 | Kaneko |
| 6,701,355 B1 | 3/2004 | Brandt et al. |
| 6,727,914 B1 | 4/2004 | Gutta |
| 7,051,352 B1 | 5/2006 | Schaffer |
| 7,337,458 B2 | 2/2008 | Michelitsch et al. |
| 7,380,262 B2 | 5/2008 | Wang et al. |
| 7,581,237 B1 | 8/2009 | Kurapati |
| 7,840,980 B2 | 11/2010 | Gutta |
| 7,985,134 B2 | 7/2011 | Ellis |
| 8,005,826 B1 | 8/2011 | Sahami et al. |
| 8,099,757 B2 | 1/2012 | Riedl et al. |
| 8,132,203 B2 | 3/2012 | Heer |
| 8,533,761 B1 | 9/2013 | Sahami et al. |
| 8,572,649 B1 | 10/2013 | Gossweiler et al. |
| 8,578,042 B2 | 11/2013 | Hu et al. |
| 8,631,440 B2 | 1/2014 | Gossweiler et al. |
| 8,826,443 B1 | 9/2014 | Raman et al. |
| 8,842,879 B2 | 9/2014 | Laksono et al. |
| 8,843,965 B1 | 9/2014 | Kurapati et al. |
| 8,954,521 B1 | 2/2015 | Faaborg et al. |
| 9,094,639 B2 | 7/2015 | Yim et al. |
| 9,130,918 B2 | 9/2015 | Picconi et al. |
| 9,342,668 B2 | 5/2016 | Wang et al. |
| 9,380,264 B1 | 6/2016 | Vakalapudi |
| 9,390,447 B1 | 7/2016 | Smith |
| 10,075,753 B2 | 9/2018 | Loheide et al. |
| 2002/0038457 A1 | 3/2002 | Numata et al. |
| 2002/0178447 A1 | 11/2002 | Plotnick et al. |
| 2003/0023757 A1 | 1/2003 | Ishioka et al. |
| 2003/0026628 A1 | 2/2003 | Arimoto |
| 2003/0051239 A1 | 3/2003 | Hudspeth |
| 2003/0110507 A1 | 6/2003 | Dimitrova et al. |
| 2003/0126600 A1 | 7/2003 | Heuvelman |
| 2003/0151538 A1 | 8/2003 | Escobosa et al. |
| 2003/0182658 A1 | 9/2003 | Alexander |
| 2003/0212708 A1 | 11/2003 | Potrebic et al. |
| 2003/0236832 A1 | 12/2003 | McIntyre et al. |
| 2004/0022278 A1 | 2/2004 | Thomas et al. |
| 2004/0031056 A1* | 2/2004 | Wolff ................. H04N 7/17309 725/110 |
| 2004/0128682 A1 | 7/2004 | Liga et al. |
| 2004/0163103 A1 | 8/2004 | Swix et al. |
| 2004/0172650 A1 | 9/2004 | Hawkins et al. |
| 2005/0015816 A1* | 1/2005 | Christofalo ............ H04N 7/165 725/136 |
| 2005/0060745 A1 | 3/2005 | Riedl et al. |
| 2005/0096978 A1 | 5/2005 | Black |
| 2005/0120369 A1 | 6/2005 | Matz |
| 2005/0132401 A1 | 6/2005 | Boccon-Gibod et al. |
| 2005/0135613 A1 | 6/2005 | Brandenburg et al. |
| 2006/0031889 A1 | 2/2006 | Bennett et al. |
| 2006/0064730 A1* | 3/2006 | Rael ................. H04L 12/2803 725/95 |
| 2006/0122916 A1 | 6/2006 | Kassan |
| 2006/0287915 A1* | 12/2006 | Boulet ................. G06Q 30/02 705/14.61 |
| 2007/0011718 A1 | 1/2007 | Nee |
| 2007/0033419 A1 | 2/2007 | Kocher et al. |
| 2007/0186228 A1 | 8/2007 | Ramaswamy et al. |
| 2007/0238035 A1 | 10/2007 | Holscher et al. |
| 2007/0250901 A1 | 10/2007 | McIntire et al. |
| 2008/0086742 A1 | 4/2008 | Aldrey et al. |
| 2008/0201735 A1 | 8/2008 | Sumiyoshi et al. |
| 2008/0271078 A1 | 10/2008 | Gossweiler et al. |
| 2008/0271080 A1 | 10/2008 | Gossweiler et al. |
| 2008/0320513 A1 | 12/2008 | Wong et al. |
| 2009/0070808 A1* | 3/2009 | Jacobs ................. H04N 7/162 725/36 |
| 2009/0070819 A1 | 3/2009 | Gajda et al. |
| 2009/0100452 A1 | 4/2009 | Hudgeons et al. |
| 2009/0254934 A1 | 10/2009 | Grammens |
| 2009/0256972 A1 | 10/2009 | Ramaswamy et al. |
| 2009/0285217 A1 | 11/2009 | Frink et al. |
| 2009/0287790 A1 | 11/2009 | Upton et al. |
| 2010/0010899 A1 | 1/2010 | Lambert et al. |
| 2010/0125880 A1 | 5/2010 | Roewe |
| 2010/0146548 A1 | 6/2010 | Yim et al. |
| 2010/0146559 A1 | 6/2010 | Lee et al. |
| 2010/0169914 A1 | 7/2010 | Williamson et al. |
| 2010/0287297 A1 | 11/2010 | Lefebvre |
| 2010/0325655 A1 | 12/2010 | Perez |
| 2010/0325657 A1 | 12/2010 | Sellers et al. |
| 2011/0022471 A1 | 1/2011 | Brueck et al. |
| 2011/0052144 A1 | 3/2011 | Abbas et al. |
| 2011/0123062 A1 | 5/2011 | Hilu |
| 2011/0153464 A1 | 6/2011 | Hendricks et al. |
| 2011/0161500 A1 | 6/2011 | Yengalasetti et al. |
| 2011/0164115 A1 | 7/2011 | Bennett et al. |
| 2011/0177775 A1 | 7/2011 | Gupta et al. |
| 2011/0209181 A1 | 8/2011 | Gupta et al. |
| 2011/0238754 A1 | 9/2011 | Dasilva et al. |
| 2011/0246202 A1 | 10/2011 | McMillan et al. |
| 2012/0017282 A1 | 1/2012 | Kang et al. |
| 2012/0110621 A1 | 5/2012 | Gossweiler |
| 2012/0143693 A1 | 6/2012 | Chung et al. |
| 2012/0192232 A1 | 7/2012 | Ellis |
| 2012/0271942 A1 | 10/2012 | Walker et al. |
| 2012/0272264 A1 | 10/2012 | Suzuki et al. |
| 2012/0284737 A1 | 11/2012 | Savoor et al. |
| 2012/0304223 A1 | 11/2012 | Sargent et al. |
| 2013/0121487 A1 | 5/2013 | Lorberbaum et al. |
| 2013/0160051 A1 | 6/2013 | Armstrong et al. |
| 2013/0198328 A1 | 8/2013 | Green et al. |
| 2013/0205212 A1 | 8/2013 | Sinha et al. |
| 2013/0208811 A1 | 8/2013 | Liu et al. |
| 2013/0227283 A1 | 8/2013 | Williamson et al. |
| 2013/0227284 A1 | 8/2013 | Pfeffer et al. |
| 2013/0263168 A1 | 10/2013 | Choi |
| 2013/0263182 A1 | 10/2013 | Ivy et al. |
| 2013/0276023 A1 | 10/2013 | Kent et al. |
| 2013/0305287 A1 | 11/2013 | Wong et al. |
| 2013/0312041 A1 | 11/2013 | Gresta |
| 2013/0325605 A1 | 12/2013 | Callaghan et al. |
| 2014/0013354 A1 | 1/2014 | Johnson et al. |
| 2014/0020017 A1 | 1/2014 | Stern et al. |
| 2014/0032259 A1 | 1/2014 | LaFever et al. |
| 2014/0033240 A1 | 1/2014 | Card |
| 2014/0071818 A1 | 3/2014 | Wang et al. |
| 2014/0143806 A1 | 5/2014 | Steinberg et al. |
| 2014/0150019 A1 | 5/2014 | Ma et al. |
| 2014/0152894 A1 | 6/2014 | Childs et al. |
| 2014/0157312 A1 | 6/2014 | Williams et al. |
| 2014/0173666 A1 | 6/2014 | Gordon et al. |
| 2014/0189514 A1 | 7/2014 | Hilliard |
| 2014/0189743 A1 | 7/2014 | Kennedy et al. |
| 2014/0189754 A1 | 7/2014 | Major et al. |
| 2014/0237243 A1 | 8/2014 | Ma et al. |
| 2014/0282723 A1 | 9/2014 | Sinha et al. |
| 2014/0310745 A1 | 10/2014 | Canney et al. |
| 2014/0317666 A1 | 10/2014 | Chiarulli et al. |

(56) References Cited

U.S. PATENT DOCUMENTS

| | | |
|---|---|---|
| 2014/0351843 A1 | 11/2014 | Theriault |
| 2014/0359656 A1 | 12/2014 | Banica et al. |
| 2014/0366068 A1 | 12/2014 | Burkitt et al. |
| 2015/0012926 A1 | 1/2015 | Wei et al. |
| 2015/0033255 A1 | 1/2015 | Neumann et al. |
| 2015/0058874 A1 | 2/2015 | Sun et al. |
| 2015/0074732 A1 | 3/2015 | Green et al. |
| 2015/0106856 A1 | 4/2015 | Rankine |
| 2015/0127845 A1 | 5/2015 | Phillips et al. |
| 2015/0237386 A1 | 8/2015 | Sheehan et al. |
| 2015/0237389 A1 | 8/2015 | Grouf et al. |
| 2015/0249865 A1 | 9/2015 | Oliveira |
| 2015/0271234 A1 | 9/2015 | O'Malley et al. |
| 2015/0289022 A1 | 10/2015 | Gross |
| 2015/0382042 A1 | 12/2015 | Wagenaar et al. |
| 2015/0382047 A1 | 12/2015 | Os et al. |
| 2015/0382274 A1 | 12/2015 | Logvinov et al. |
| 2016/0029055 A1 | 1/2016 | Nunez et al. |
| 2016/0063530 A1 | 3/2016 | Lin |
| 2016/0073155 A1 | 3/2016 | Subramaniam et al. |
| 2016/0112740 A1 | 4/2016 | Francisco et al. |
| 2016/0127786 A1 | 5/2016 | Langer |
| 2016/0127788 A1 | 5/2016 | Roberts et al. |
| 2016/0182954 A1 | 6/2016 | Nguyen et al. |
| 2016/0198202 A1 | 7/2016 | Brandenburg et al. |
| 2016/0227260 A1 | 8/2016 | Hundemer et al. |
| 2016/0255391 A1 | 9/2016 | Noble |
| 2016/0308958 A1* | 10/2016 | Navali ............... H04L 67/1031 |
| 2016/0316247 A1 | 10/2016 | Biagini et al. |
| 2017/0064400 A1 | 3/2017 | Riegel et al. |
| 2017/0070789 A1 | 3/2017 | Liassides et al. |
| 2017/0085935 A1 | 3/2017 | Riedel et al. |
| 2017/0099506 A1 | 4/2017 | Grover |
| 2017/0099525 A1 | 4/2017 | Ray et al. |
| 2017/0171610 A1 | 6/2017 | Nair et al. |
| 2017/0193544 A1 | 7/2017 | Glasgow et al. |
| 2017/0195718 A1* | 7/2017 | Nair ................... H04N 21/2362 |
| 2017/0201779 A1 | 7/2017 | Publicover et al. |
| 2017/0238035 A1 | 8/2017 | Perez |
| 2017/0289597 A1* | 10/2017 | Riedel ............. H04N 21/25891 |
| 2018/0007060 A1 | 1/2018 | Leblang et al. |
| 2018/0048599 A1 | 2/2018 | Arghandiwal et al. |
| 2018/0131986 A1 | 5/2018 | Cole et al. |
| 2018/0165650 A1 | 6/2018 | Kashyape et al. |
| 2018/0184047 A1 | 6/2018 | Simonsen et al. |
| 2018/0300751 A1 | 10/2018 | Hammitt et al. |
| 2018/0343505 A1 | 11/2018 | Loheide et al. |
| 2020/0244778 A1 | 7/2020 | Berookhim et al. |

OTHER PUBLICATIONS

Advisory Action for U.S. Appl. No. 15/988,308 dated Jul. 16, 2019.
Advisory Action for U.S. Appl. No. 15/986,218 dated Jul. 12, 2019.
Corrected Notice of Allowance for U.S. Appl. No. 15/396,453 dated Jun. 3, 2019.
Corrected Notice of Allowance in U.S. Appl. No. 15/396,453 dated Jun 13, 2019.
Final Office Action for U.S. Appl. No. 15/986,218 dated Apr. 24, 2019.
Final Office Action for U.S. Appl. No. 15/988,308 dated May 9, 2019.
Final Office Action in U.S. Appl. No. 15/986,218 dated Apr. 24, 2019.
Non-Final Office Action for U.S. Appl. No. 15/986,361 dated Jul. 11, 2019.
Non-Final Office Action for U.S. Appl. No. 15/986,451 dated Jun. 27, 2019.
Non-final Office Action for U.S. Appl. No. 15/988,241 dated Jun. 27, 2019.
Notice of Allowance for U.S. Appl. No. 15/396,624 dated May 31, 2019.
Advisory Action for U.S. Appl. No. 15/396,614 dated Oct. 24, 2019.
Corrected Notice of Allowance for U.S. Appl. No. 15/396,453 dated Aug. 21, 2019.
Corrected Notice of Allowance for U.S. Appl. No. 15/396,624 dated Sep. 5, 2019.
Final Office Action for U.S. Appl. No. 15/396,468 dated Nov. 6, 2019.
Final Office Action for U.S. Appl. No. 15/396,614 dated Aug. 12, 2019.
Non-Final Office Action for U.S. Appl. No. 15/396,475 dated Aug. 8, 2019.
Non-Final Office Action for U.S. Appl. No. 15/396,624 dated Oct. 16, 2019.
Non-Final Office Action for U.S. Appl. No. 15/986,218 dated Sep. 27, 2019.
Non-Final Office Action for U.S. Appl. No. 16/128,104 dated Aug. 21, 2019.
Supplemental Notice of Allowance for U.S. Appl. No. 15/396,624 dated Aug. 14, 2019.
Advisory Action in U.S. Appl. No. 15/396,453 dated Apr. 20, 2018.
Advisory Action in U.S. Appl. No. 15/396,468 dated Jan. 7, 2019.
Advisory Action in U.S. Appl. No. 15/396,475 dated Sep. 20, 2018.
Advisory Action in U.S. Appl. No. 15/396,614 dated Mar. 16, 2018.
Corrected Notice of Allowance in U.S. Appl. No. 15/396,462 dated Aug. 8, 2018.
Corrected Notice of Allowance in U.S. Appl. No. 15/396,462 dated Jul. 11, 2018.
Final Office Action in U.S. Appl. No. 15/396,468 dated Nov. 15, 2018.
Final Office Action in U.S. Appl. No. 15/396,475 dated Feb. 25, 2019.
Final Office Action in U.S. Appl. No. 15/396,475 dated Jul. 12, 2018.
Final Office Action in U.S. Appl. No. 15/396,614 dated Oct. 25, 2018.
Final Office Action in U.S. Appl. No. 15/396,624 dated Jan. 24, 2019.
Non-Final Office Action in U.S. Appl. No. 15/396,453 dated Jun. 14, 2018.
Non-Final Office Action in U.S. Appl. No. 15/396,468 dated Jul. 3, 2018.
Non-Final Office Action in U.S. Appl. No. 15/396,468 dated Mar. 1, 2019.
Non-Final Office Action in U.S. Appl. No. 15/396,475 dated Nov. 30, 2018.
Non-Final Office Action in U.S. Appl. No. 15/396,614 dated Mar. 7, 2019.
Non-Final Office Action in U.S. Appl. No. 15/396,614 dated May 18, 2018.
Non-Final Office Action in U.S. Appl. No. 15/396,624 dated Jul. 13, 2018.
Non-Final Office Action in U.S. Appl. No. 15/986,218 dated Nov. 28, 2018.
Notice of Allowance in U.S. Appl. No. 15/396,453 dated Jan. 10, 2019.
Notice of Allowance in U.S. Appl. No. 15/396,462 dated Jun. 1, 2018.
Notice of Allowance in U.S. Appl. No. 15/396,462 dated May 15, 2018.
Office Action in U.S. Appl. No. 15/396,468 dated Jan. 26, 2018.
Office Action in U.S. Appl. No. 15/396,453 dated Feb. 27, 2018.
Office Action in U.S. Appl. No. 15/396,475 dated Mar. 29, 2018.
Advisory Action for U.S. Appl. No. 15/396,468 dated Jan. 16, 2020.
Advisory Action for U.S. Appl. No. 15/986,361 dated Feb. 26, 2020.
Advisory Action for U.S. Appl. No. 15/986,451 dated Feb. 20, 2020.
Final Office Action for U.S. Appl. No. 15/396,475 dated Feb. 4, 2020.
Final Office Action for U.S. Appl. No. 15/986,218 dated Jan. 31, 2020.
Final Office Action for U.S. Appl. No. 15/986,361 dated Dec. 23, 2019.
Final Office Action for U.S. Appl. No. 15/986,451 dated Dec. 16, 2019.

(56) References Cited

OTHER PUBLICATIONS

Final Office Action for U.S. Appl. No. 15/988,241 dated Jan. 8, 2020.
Non-Final Office Action for U.S. Appl. No. 15/396,468 dated Feb. 4, 2020.
Non-Final Office Action for U.S. Appl. No. 15/986,406 dated Dec. 18, 2019.
Non-Final Office Action for U.S. Appl. No. 15/986,286 dated Nov. 29, 2019.
Non-Final Office Action for U.S. Appl. No. 15/988,308 dated Dec. 3, 2019.
Non-Final Office Action for U.S. Appl. No. 15/988,472 dated Dec. 27, 2019.
Non-Final Office Action for U.S. Appl. No. 15/988,492 dated Feb. 18, 2020.
Non-Final Office Action for U.S. Appl. No. 16/229,310 dated Nov. 29, 2019.
Non-Final Office Action for U.S. Appl. No. 16/230,268 dated Jan. 8, 2020.
Non-Final Office Action for U.S. Appl. No. 16/234,870 dated Jan. 9, 2020.
Non-Final Office Action for U.S. Appl. No. 16/236,673 dated Jan. 10, 2020.
Notice of Allowance for U.S. Appl. No. 16/128,104 dated Dec. 12, 2019.
Restriction Requirement for U.S. Appl. No. 16/231,467 dated Feb. 5, 2020.
Advisory Action for U.S. Appl. No. 15/396,475 dated May 13, 2020.
Corrected Notice of Allowance for U.S. Appl. No. 15/988,241 dated May 8, 2020.
Corrected Notice of Allowance for U.S. Appl. No. 16/128,104 dated Apr. 15, 2020.
Corrected Notice of Allowance for U.S. Appl. No. 16/128,104 dated May 20, 2020.
Final Office Action for U.S. Appl. No. 15/988,308 dated May 6, 2020.
Final Office Action for U.S. Appl. No. 15/986,286 dated Jun. 9, 2020.
Final Office Action for U.S. Appl. No. 15/986,406 dated May 26, 2020.
Final Office Action for U.S. Appl. No. 15/988,492 dated May 28, 2020.
Final Office Action for U.S. Appl. No. 16/229,310 dated Jun. 11, 2020.
Final Office Action for U.S. Appl. No. 16/230,268 dated Apr. 17, 2020.
Non-Final Office Action for U.S. Appl. No. 15/986,451 dated Apr. 16, 2020.
Non-Final Office Action for U.S. Appl. No. 16/229,614 dated Mar. 19, 2020.
Non-Final Office Action for U.S. Appl. No. 16/235,445 dated Apr. 2, 2020.
Non-Final Office Action for U.S. Appl. No. 16/236,713 dated May 29, 2020.
Notice of Allowability for U.S. Appl. No. 15/986,361 dated May 15, 2020.
Notice of Allowance for U.S. Appl. No. 15/986,361 dated Apr. 8, 2020.
Notice of Allowance for U.S. Appl. No. 15/988,241 dated Mar. 18, 2020.
Notice of Allowance for U.S. Appl. No. 16/231,467 dated Apr. 16, 2020.
Notice of Allowance in U.S. Appl. No. 16/236,673 dated May 1, 2020.
Corrected Notice of Allowance for U.S. Appl. No. 15/988,241 dated Aug. 13, 2020.
Corrected Notice of Allowance for U.S. Appl. No. 15/988,241 dated Jun. 22, 2020.
Corrected Notice of Allowance for U.S. Appl. No. 16/128,104 dated Jul. 8, 2020.
Corrected Notice of Allowance for U.S. Appl. No. 16/236,673 dated Sep. 21, 2020.
Final Office Action for U.S. Appl. No. 15/988,572 dated Jul. 2, 2020.
Final Office Action for U.S. Appl. No. 16/229,614 dated Jul. 9, 2020.
Final Office Action for U.S. Appl. No. 16/234,870 dated Jul. 9, 2020.
Final Office Action for U.S. Appl. No. 16/235,445 dated Sep. 3, 2200.
Non-Final Office Action for U.S. Appl. No. 15/396,475 dated Aug. 6, 2020.
Non-Final Office Action for U.S. Appl. No. 15/988,308 dated Sep. 8, 2020.
Non-Final Office Action for U.S. Appl. No. 15/988,492 dated Sep. 10, 2020.
Notice of Allowability for U.S. Appl. No. 15/986,361 dated Aug. 18, 2020.
Notice of Allowability for U.S. Appl. No. 15/986,361 dated Jul. 14, 2020.
Notice of Allowance for U.S. Appl. No. 15/986,218 dated Jul. 13, 2020.
Notice of Allowance for U.S. Appl. No. 15/988,241 dated Aug. 26, 2020.
Notice of Allowance for U.S. Appl. No. 16/230,268 dated Aug. 24, 2020.
Notice of Allowance for U.S. Appl. No. 16/234,870 dated Aug. 19, 2020.
Corrected Notice of Allowance for U.S. Appl. No. 16/234,870 dated Feb. 24, 2021.
Corrected Notice of Allowance for U.S. Appl. No. 16/234,870 dated Jan. 15, 2021.
Final Office Action for U.S. Appl. No. 15/396,468 dated Feb. 10, 2021.
Final Office Action for U.S. Appl. No. 15/988,308 dated Jan. 28, 2021.
Final Office Action for U.S. Appl. No. 15/988,492 dated Jan. 6, 2021.
Non-Final Office Action for U.S. Appl. No. 16/854,970 dated Mar. 17, 2021.
Notice of Allowance for U.S. Appl. No. 15/396,475 dated Feb. 5, 2021.
Notice of Allowance for U.S. Appl. No. 15/986,406 dated Mar. 3, 2021.
Notice of Allowance for U.S. Appl. No. 16/229,614 dated Feb. 18, 2021.
Notice of Allowance for U.S. Appl. No. 16/230,493 dated Feb. 12, 2021.
Notice of Allowance for U.S. Appl. No. 16/902,775 dated Feb. 2, 2021.
Supplemental Notice of Allowance for U.S. Appl. No. 15/986,218 dated Jan. 27, 2021.
Corrected Notice of Allowance for U.S. Appl. No. 15/988,241 dated Nov. 18, 2020.
Corrected Notice of Allowance for U.S. Appl. No. 16/230,268 dated Dec. 2, 2020.
Corrected Notice of Allowance for U.S. Appl. No. 16/230,268 dated Oct. 9, 2020.
Corrected Notice of Allowance for U.S. Appl. No. 16/231,467 dated Nov. 20, 2020.
Corrected Notice of Allowance for U.S. Appl. No. 16/231,467 dated Oct. 1, 2020.
Corrected Notice of Allowance for U.S. Appl. No. 16/236,673 dated Oct. 23, 2020.
Final Office Action for U.S. Appl. No. 15/986,451 dated Sep. 29, 2020.
Final Office Action for U.S. Appl. No. 16/236,713 dated Sep. 30, 2020.
Non-Final Office Action for U.S. Appl. No. 15/986,406 dated Oct. 30, 2020.

(56) References Cited

OTHER PUBLICATIONS

Non-Final Office Action for U.S. Appl. No. 15/988,572 dated Nov. 6, 2020.
Non-Final Office Action for U.S. Appl. No. 16/902,775 dated Oct. 5, 2020.
Notice of Allowability for U.S. Appl. No. 15/986,361 dated Sep. 30, 2020.
Notice of Allowance for U.S. Appl. No. 16/229,310 dated Dec. 14, 2020.
Notice of Allowance for U.S. Appl. No. 16/235,445 dated Nov. 4, 2020.
Notice of Allowance for U.S. Appl. No. 16/236,713 dated Nov. 18, 2020.

* cited by examiner

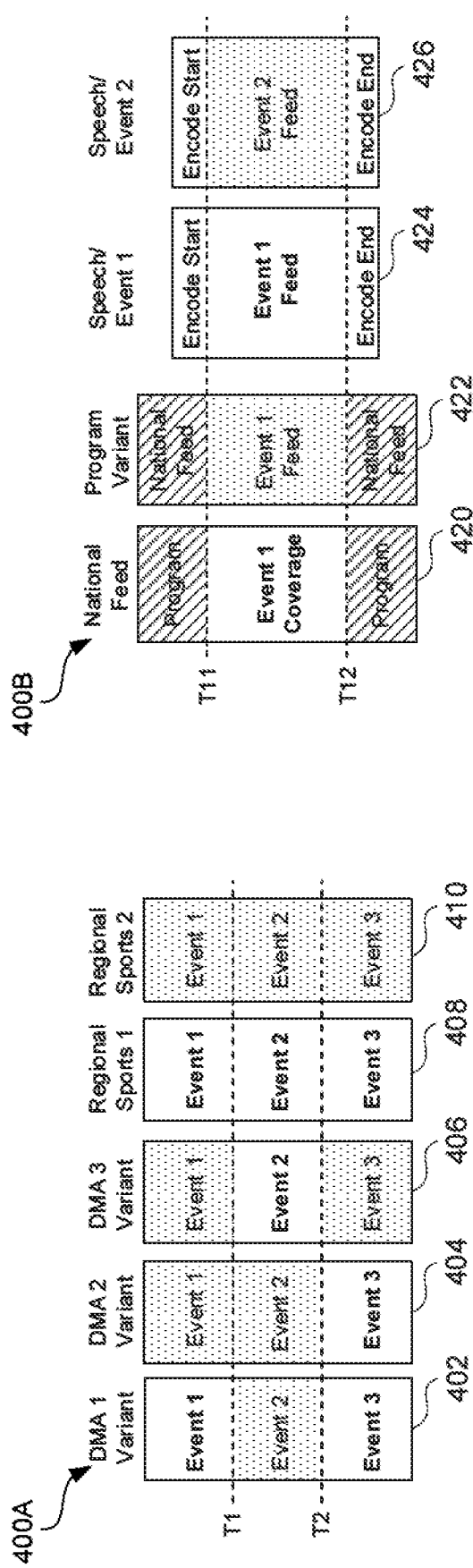
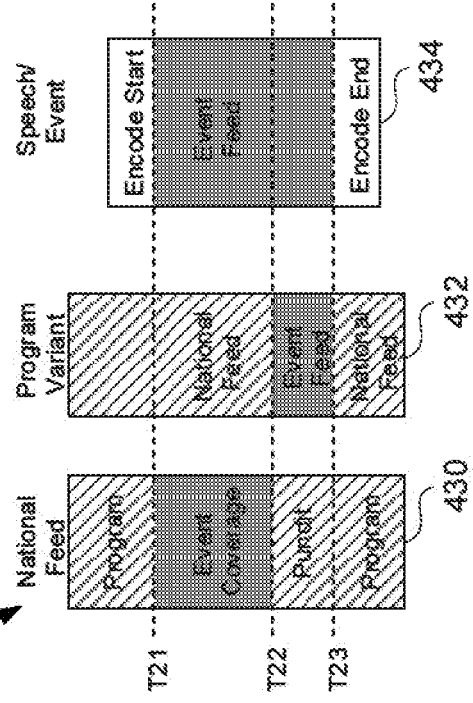
FIG. 4A
FIG. 4B
FIG. 4C

PUBLISHING DISPARATE LIVE MEDIA OUTPUT STREAMS USING LIVE INPUT STREAMS

CROSS-REFERENCE TO RELATED APPLICATIONS/INCORPORATION BY REFERENCE

This patent application is a Continuation-in-part of U.S. patent application Ser. No. 15/396,475, filed on Dec. 31, 2016, and claims priority to, and the benefit from U.S. Provisional Application Ser. No. 62/699,131, filed Jul. 17, 2018.

This application also makes reference to:
U.S. application Ser. No. 15/988,241, filed on May 24, 2018;
U.S. application Ser. No. 16/229,310, filed on Dec. 21, 2018
U.S. application Ser. No. 16/229,614, filed on Dec. 21, 2018;
U.S. application Ser. No. 16/235,445, filed on Dec. 28, 2018; and
U.S. application Ser. No. 16/236,673, filed on Dec. 28, 2018.

Each of the above referenced patent applications is hereby incorporated herein by reference in its entirety.

FIELD OF TECHNOLOGY

Certain embodiments of the disclosure relate to a television content packaging and distribution system. More specifically, certain embodiments of the disclosure relate to a method and system for publishing disparate live media output streams using live input streams.

BACKGROUND

The past decade has witnessed a massive expansion of live web simulcast services in the field of advertisement-based broadcasting and cable networking systems. Broadcasting platforms usually refers to the types of networks that are used to deliver the media content to the viewer. Currently, all the broadcasting platforms, such as analog terrestrial broadcast, digital terrestrial broadcast, direct-to-home satellite broadcast, cable, Internet Protocol (IP), and over-the-top television (OTT), compete and strive to increase their appeal in order to gain wider audience.

Modern web streaming protocols, such as HTTP Live Streaming (HLS) and Dynamic Adaptive Streaming over HTTP (DASH), are implemented to support streaming of live content services, such as DIRECTV NOW$^{SM}$, SLING TV$^{SM}$ and PLAYSTAYION™ VUE, to consumer devices. Traditional service providers, such as COMCAST$^{SM}$, also have set-top boxes capable of receiving both legacy broadcast distribution protocols as well as modern web streaming protocols. However, such traditional service providers are constrained by the number of broadcast channels they can support on the legacy infrastructure and are more likely to allow more niche-based programming using Internet-based distribution.

Technically, such modern web streaming protocols break media content into numerous small media content segments, typically less than 10 seconds in length. A manifest instructs a media player what media content segment to play next. The manifest and/or media content segment may also include and/or specify additional information to facilitate a media player to transition smoothly between media content streams from different sources. The manifest may be used for creating a playlist of multiple media content files, or for interrupting media content with advertising and then resuming the media content.

In live streaming, delivery of live content is supported by making available each new short media content segments as soon as such media content segments are generated. In some protocols, new media content segments may be added to the manifest, while in others, the player calculates necessary information about the next live media content segments. With services, such as live sports, there may be geographic restrictions on where events may be made available. Further, rights restrictions associated with the delivery of certain media content may also be there over the Internet. Effectively, for example, in a specific geography, there are "35" regional sports networks and "210" television markets created based on static rule sets (primarily comprising geolocation-based criteria). Furthermore, because the media content is required to be processed and encoded beyond the initial creation of the live streams prepared for distribution, it is extremely expensive to provide the multiple disparate live media output streams to consumer devices.

Given the trends toward media content distribution using internet protocols, there is required a system to eliminate the need for a high cost broadcast infrastructure and deliver live channels with such restrictions and high cost for web distribution. Thus, an advanced system may be required that provides the network provider with the capability to not only provide new channel offerings in cost-effective manner but also provide enhanced and intelligent viewer experience to increase their appeal in order to gain a wider audience.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for publishing disparate live media output streams using live input streams, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIGS. 4A to 4C illustrate various second exemplary scenarios associated with playout of a disparate live media output stream, in accordance with an exemplary embodiment of the disclosure.

DETAILED DESCRIPTION OF THE DISCLOSURE

Certain embodiments of the disclosure may be found in a method and system for publishing disparate live media output streams. Various embodiments of the disclosure provide a method and system that simplifies live channel creation and provides the network provider with the capability to not only provide live channel offerings in cost-effective manner but also provide enhanced viewer experience to increase their appeal in order to gain wider audience.

In accordance with various embodiments of the disclosure, a live media content switching system or apparatus is provided for publishing disparate live media output streams to be viewed on a plurality of consumer devices. The live media content switching system or apparatus receives a plurality of live input streams associated with a plurality of live input stream manifests. One or more events in a first live input stream manifest of the plurality of live input stream manifests are identified. The first live input stream manifest is associated with a first live input stream of the plurality of live input streams being viewed at a consumer device. Based on the identification, information related to a plurality of first media segments and the one or more events from the first live input stream indicated in a first live input stream manifest is inserted into a first disparate live media output stream manifest based on a programming schedule. The first disparate live media output stream of a plurality of disparate live media output streams is published for the consumer device based on the first live input stream manifest. In accordance with an embodiment, the generated first disparate live media output stream may be published in a content delivery system for distribution to a plurality of consumer devices.

Figure 1A:
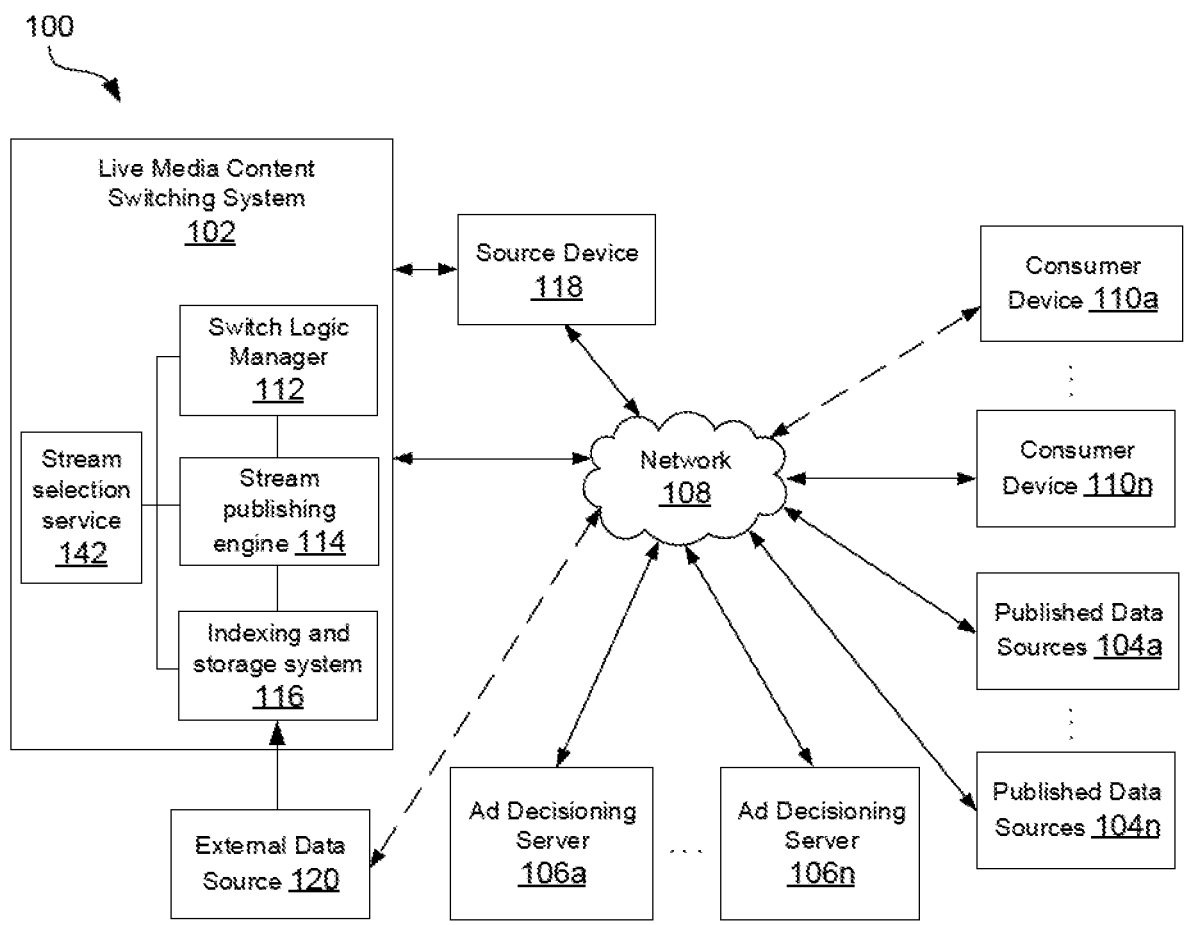
FIG. 1A is a block diagram that illustrates an exemplary system for publishing disparate live media output streams using live input streams, in accordance with an exemplary embodiment of the disclosure.

FIG. 1A is a block diagram that illustrates an exemplary system for publishing disparate live media output streams using live input streams, in accordance with an exemplary embodiment of the disclosure. Referring to FIG. 1A, the system 100, comprises a live media content switching system 102 that is communicatively coupled to published data sources 104a, . . . , 104n, Ad decisioning servers 106a, . . . , 106n, via a network 108 and/or other programmatic means. There are shown consumer devices 110a, . . . , 110n that are communicatively coupled to the network 108. The live media content switching system 102 may comprise at least a switch logic manager 112, a stream publishing engine 114, an indexing and storage system 116, and a stream selection service 142. There are also shown source devices 118 communicatively coupled to the live media content switching system 102 through the network 108. An external data source 120 is also provided, which is communicatively coupled to the live media content switching system 102 through the network 108.

The live media content switching system 102 may comprise suitable logic, circuitry, and interfaces that may be configured to execute code that handles media content comprising audio, video, images, metadata, manifests, and/or other data (embedded and/or externally referenced). The media content may include a video, an audio, a combination of audio and video presentations, a combination of audio, video, and/or embedded or externally referenced metadata, a combination of multiple-audio, multiple-video, and/or embedded or externally referenced metadata.

In other words, the live media content switching system 102 may provide video programming services to viewers, usually for a subscription fee (such as pay television). The live media content switching system 102 generates a plurality of disparate live media output streams to be viewed on the plurality of consumer devices 110a, . . . , 110n. The live media content switching system 102 also handles distribution, for example, multicasting, unicasting, broadcasting, streaming, for one or more channels to be viewed on one or more consumer devices of the plurality of consumer devices 110a, . . . , 110n.

The live media content switching system 102 may be operated by an entity related to handling or distribution of media content, for example, a broadcast provider or operator, or a network provider or network operator. The entity related to handling or distribution of media content may also be referred to as a content owner, a distributor, a syndicator, a re-distributor, a content aggregator, a search, discovery, or cataloging service provider, or any other entity actively or passively involved with the distribution, cataloging, or referencing of complete or partial presentations of media content. Throughout this document, the terms broadcast provider or broadcast operator, and network provider or network operator may be utilized to refer to the entity related to handling or distribution of media content, interchangeably. The broadcast provider may handle a single channel or a plurality of channels, or one or more networks. The broadcast provider may be configured to distribute content via one or more platforms, for example, traditional over-the-air broadcast channels, radio, cable television networks, satellite communication networks, the Internet, and/or other content delivery networks (CDNs). In other words, the broadcast provider may be configured to execute code that communicates linear video feeds (also referred to as a network television feed or broadcast feed) to the live media content switching system 102. In a broadcast chain, the broadcast provider may receive actual content, for example, from a production studio, in a serial digital interface (SDI) video interface and/or on a high-definition SDI (HD-SDI) video interface, process the content, such as insertion of graphics, closed captions, preparation of programming schedule, insertion of triggers, and the like, and final delivery by a broadcasting apparatus. The communicated linear video feed and the playout schedule may correspond to a channel, such as CNN channel that is broadcast to the live media content switching system 102, via a communication network. The linear video feed may be broadcasted as a multi-program transport stream (MPTS). In an embodiment, a live stream encoder/packager may be configured to convert the MPTS to web distribution protocols prior to feeding to the live media content switching system 102, via the network 108. The broadcast provider may be owned by (or associated to) a broadcast provider or operator, a network provider or operator, or a content provider or operator.

The live media content switching system 102 may receive the web distribution protocols, which includes the signaling content and metadata, from the broadcast provider based on, for example, current society of cable telecommunication engineers (SCTE) standards (SCTE-35 and SCTE-224) to control web and regional blackouts, network end of day switching, and advertisement insertion. For example, the live media content switching system 102 may be signaled for various blackout types with in-band SCTE-35 message. Further, the live media content switching system 102 may receive program metadata that specifies certain events or operations, such as, for example, when to blackout shows. The live media content switching system 102 may benefit various entities, for example direct-broadcast satellite (DBS) providers, cable television (CATV) systems, and other wireline video providers and competitive local exchange carriers (CLECs) using, for example, IPTV.

Each of the plurality of published data sources 104a, . . . , 104n may be coupled to one or more television networks and may comprise suitable logic, circuitry, and interfaces that may be configured to execute code that provides actual audiences for programs that were distributed. As illustrated in FIG. 1A, the plurality of published data sources 104a, . . . , 104n are coupled to the live media content switching system 102 via the network 108. The plurality of published data sources 104a, . . . , 104n may provide actual audiences for programs to the indexing and storage system 116. An exemplary published data source may be Nielsen. Nielsen has the capability to determine when a viewer watches the same set of media items, for example, advertisements and/or promotional content, in programming data, such as an episode, in a live video feed within 3 days of original airing, and provide Nielsen "C3" credit. Another exemplary published data source may be a published database that provides ratings for a media item, such as gross rating point (GRP). The GRP is advertising or promotion impact measure for each advertising and/or promotional campaigns, known in the art. Other exemplary published data sources may also include direct/indirect access to other public or private data sources (persistent or ephemeral) through programmatic means.

The Ad decisioning servers 106a, . . . , 106n may comprise suitable logic, circuitry, and interfaces that may be configured to implement at least an advertisement decisioning component that may be used during a real-time content or advertisement placement activity, for example during dynamic ad insertion. For example, commercial or non-commercial advertisements may be dynamically inserted within program segments of the live input streams based on the detected upcoming indicator, such as an inbound trigger, a signaling point, and/or a signal in a live input stream by the Ad decisioning servers 106a, . . . , 106n. The Ad decisioning servers 106a, . . . , 106n may receive a request for retrieval of non-programming content, for example, ads, from a non-programming content proxy server (not shown). Specifically, the Ad decisioning servers 106a, . . . , 106n may receive the request from one or more consumer devices of the plurality of consumer devices 110a, . . . , 110n, via the non-programming content proxy server (not shown). The request may be received when one or more indicators and/or pre-encoded place holder content segment for a scheduled duration of one or more non-programming content breaks, as defined by the received programming schedule, is encountered in the disparate live media output stream manifest during media content playout by media players at the one or more consumer devices of the plurality of consumer devices 110a, . . . , 110n.

Thus, for requests received from the plurality of consumer devices 110a, . . . , 110n, based on corresponding disparate live media output stream manifests, the Ad decisioning servers 106a, . . . , 106n may identity the opportunities for the real-time content or advertisement placement activity. In other words, as the advertisement decisioning component of the Ad decisioning servers 106a, . . . , 106n is implemented in a consumer device, such as one or more consumer devices of the plurality of consumer devices 110a, . . . , 110n, the Ad decisioning servers 106a, . . . , 106n may identify real-time content or advertisement placement opportunity for dynamic ad insertion. For example, commercial or non-commercial advertisements may be dynamically inserted within program segments of a media feed by the Ad decisioning servers 106a, . . . , 106n based on the indicator detected by the media player or the non-programming content proxy server. The detected indicator may be, for example upcoming inbound trigger, signaling point, and/or signal, in the disparate live media output stream manifest. In various embodiments, the advertisement decisioning component of the Ad decisioning servers 106a, . . . , 106n may be configured to determine which advertisements, overlay graphics and presentation information to serve to the consumer devices 110a, . . . , 110n based on stream ID, a program ID, a geographical location, time, and any preferences associated with an individual consumer or an advertisement ID specified by the disparate live media output stream manifest.

The network 108 may be any kind of network, or a combination of various networks, and it is shown illustrating the communication that may occur between the Ad decisioning servers 106a, . . . , 106n and the live media content switching system 102. For example, the network 108 may comprise at least one of a cable television network, the Internet, a satellite communication network, a wide area network (WAN), a medium area network (MAN), and a local area network (LAN). Although a network 108 is shown, the disclosure is not limited in this regard; accordingly, other exemplary modes may comprise uni-directional or bi-directional distribution, such as packet-radio, satellite. Furthermore, the network 108 is an exemplary embodiment of a distribution system.

The consumer devices 110a, . . . , 110n may refer to end-user devices or consumption devices where the content is played to be consumed by a user. The number of impressions of a media item, such as an advertisement and/or promotional media, on such plurality of consumer devices 110a, . . . , 110n determines the advertising impact or promotion impact and number of actual audiences achieved during campaigns. Examples of the consumer devices 110a, . . . , 110n may include, but are not limited to connected TVs, connected TV with paired and/or connected devices (e.g., HDMI sticks, tablets), personal computer, smartphone, tablet, OTT set-top, or hybrid set-top, and second screen devices such as smartphones, tablets, game consoles, personal computers, set-top boxes, embedded devices, or any process/system capable of processing the output for any means, regardless of the capability or intent to decode for media presentation, and on which the consumer may launch a web page, a web application, or a web service to view media content.

The switch logic manager 112 may comprise suitable logic, circuitry, and interfaces that may be configured to execute a code that creates and handles a programming schedule of live input streams for a channel. The programming schedule defines which live input streams should be scheduled, time and duration at which the live input streams should be played in the generated disparate live media output streams, the ordering of the live input streams during playout, and when to distribute the media content to the consumer devices 110*a*, . . . , 110*n* over the web application, service or page. The switch logic manager 112 may create the programming schedule based on schedules, rights, and preferences databases along with stream/owner operator requirements. The switch logic manager 112 may also determine required number of disparate live media output streams. For example, the switch logic manager 112 may determine that based on live input streams from 35 regional sources, based on schedules, rights, and user preferences, 210 or more disparate live media output streams are generated.

The media content that is distributed may include both the programming content, such as long-form presentations, short-form presentations, news or sporting events, and non-programming content, such as paid advertisements, public service advertisements, or promotional material. In accordance with an embodiment, the programming schedule may comprise data structures or file formats capable of being processed by a computer, that comprise a reference mapping of different media content items that needs to be utilized by the stream publishing engine 114. The switch logic manager 112 may modify the received programming schedule to generate an updated programming schedule, where the generation of the updated programming schedule may be driven by real time or near-real time content context analysis, user-selection on a consumer device, such as the consumer devices 110*a*, . . . , 110*n*, or driven by external data received from the external data source 120.

The switch logic manager 112, thus, generates an instruction set as the programming schedule for each disparate live media output stream to be generated and informs the stream publishing engine 114. In accordance with an embodiment, the programming schedule may be a text file or an XML file, which comprises a reference mapping of different media content items or media segments of the live input streams.

The stream publishing engine 114 may comprise suitable logic, circuitry, and interfaces that may be configured to execute a code to generate a disparate live media output stream for a new channel to be viewed on a consumer device in accordance with the specified play schedule, such as the updated programming schedule. The stream publishing engine 114 may be configured to generate live media output streams by publishing unique streaming live media output stream manifests leveraging different indices created by the indexing and storage system 116, based on the generated programming schedule. Accordingly, the stream publishing engine 114 may generate a specific live media output stream to be delivered to one or more consumer devices of the plurality of consumer devices 110*a*, . . . , 110*n* over a web page, service or application, based on manipulated manifests. In accordance with an embodiment, the stream publishing engine 114 may be configured to insert media segments that are referenced by manifests associated with a plurality of live input streams indexed by the indexing and storage system 116 into a disparate live media output stream manifest on intervals equal to a content segment duration to generate a disparate live media output stream for a new channel. The manifest may correspond to a text-based instruction set that may instruct the consumer devices 110*a*, . . . , 110*n* which and where to acquire the live input streams to play. The disparate live media output stream, thus generated, is in a suitable state (or ready) to be distributed to web media players in one or more consumer devices of the plurality of consumer devices 110*a*, . . . , 110*n* without a requirement to re-encode the live input streams before the web distribution of the disparate live media output stream for the new channel.

In this regard, the disparate live media output stream may be tailored for a single consumer device 110*a*, . . . , 110*n*, or for a plurality of the consumer devices 110*a*, . . . , 110*n*. The decisioning as to which live input streams to select for delivery over the network 108 to the one or more consumer devices of the plurality of consumer devices 110*a*, . . . , 110*n* may be based on the manipulation of the manifests that correspond to the programming schedules in real time or near-real time. The manipulation of the manifests correspond to the programming schedules that may be driven by, for example real time or near-real time content context analysis, user-selection on the consumer devices 110*a*, . . . , 110*n*, or external data received from the external data source 120, in addition to the real-time data, such as schedule, rights, and preferences databases, and stream operator preferences, received from various databases, as described in detail in FIG. 1B. The stream publishing engine 114 may also be referred to as a stream manipulator that may be configured to insert media segments from live input streams, in an existing program stream, based on manipulation of manifests corresponding to programming schedule of the existing program stream, such as an existing channel.

The indexing and storage system 116 may comprise suitable logic, circuitry, and interfaces that may be configured to be continuously ingested with a plurality of manifests associated with the plurality of live input streams. The indexing and storage system 116 may also store, maintain, process, and generate alerts. In accordance with an embodiment, the indexing and storage system 116 may be configured to ingest the manifests of the live input streams, and index the listed media segments, indexing of program boundaries and tags marking, advertisement break locations, overlay opportunities credits, digital rights management systems supported in the indexing and storage system 116.

The source devices 118 may comprise suitable logic, circuitry, and interfaces that may be configured to communicate a live media feed or live input streams of a channel, such as an existing channel, to the live media content switching system 102. In accordance with an embodiment, the live input streams of the channel may correspond to a broadcast feed. The source device 118 may be communicatively coupled to the network 108.

The external data source 120 may comprise suitable logic, circuitry, and interfaces that may be configured to execute code that handles retrieval and storage of audience data that corresponds to subscribers of the plurality of consumer devices 110*a*, . . . , 110*n*. The audience data may include demographics data, audience targeting data, trending data, device type data, device platform data, and content recognition-based data, such as an automatic content recognition (ACR)-based data. The trending data comprises information on what's trending in the social networks (or platforms), such as Twitter®, Facebook®, and the like. The trending data also comprises information on what's trending based on social engagement, such as number of likes or votes to a particular media item, or number of people watching a particular media item. The trending data may indicate an aggregate interest level of a number of users in the social networks for a particular media item. For example, a thousand or more shares, or likes by a number of users may indicate a highly popular media item.

Figure 1B:
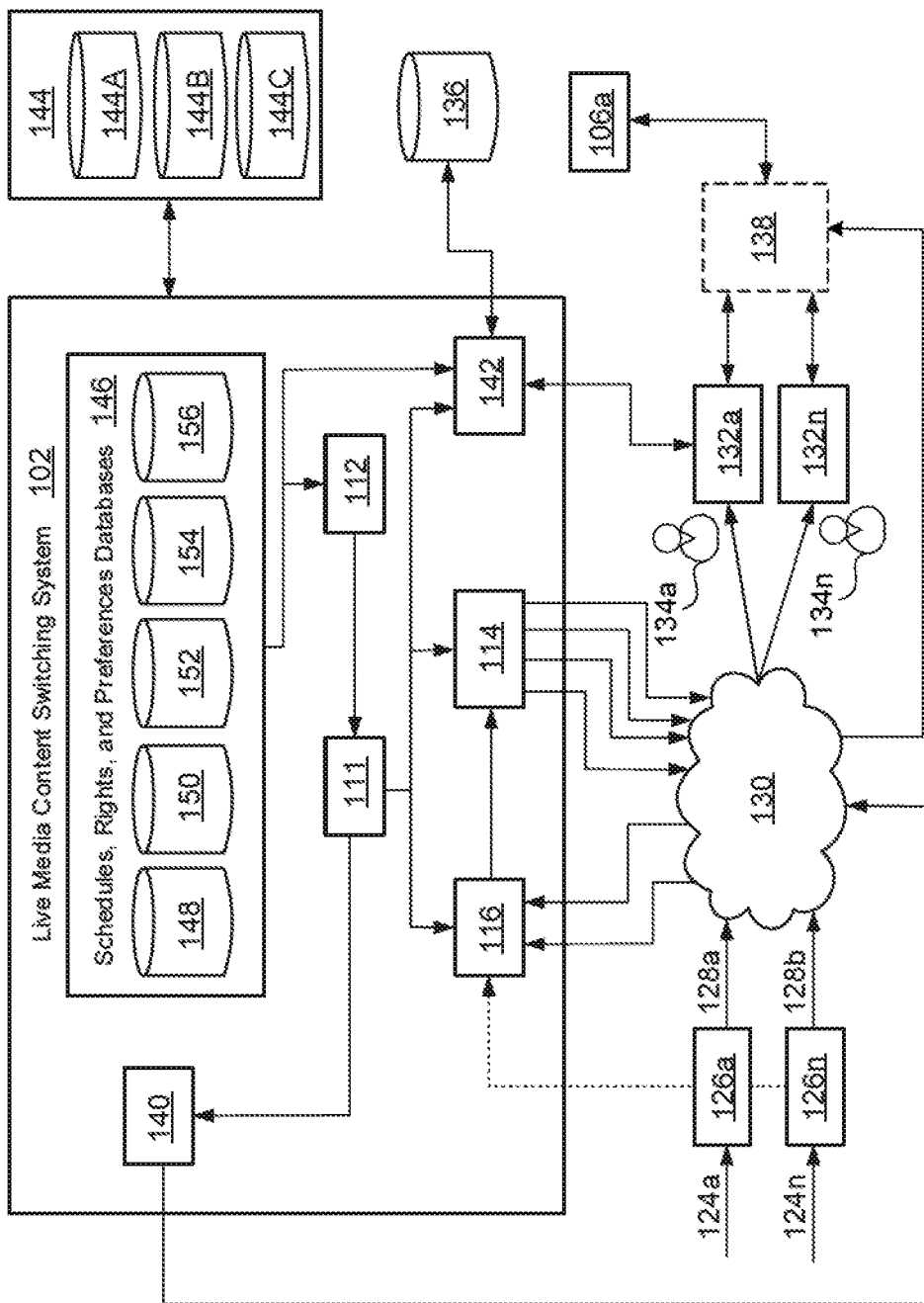
FIG. 1B is a block diagram that illustrates an exemplary live media content switching system for publishing disparate live media output streams using live input streams, in accordance with an exemplary embodiment of the disclosure.

In operation, live stream encoder/packagers, for example a plurality of live stream encoder/packagers 126a, ..., 126n described in FIG. 1B, may encode and package a plurality of live feeds received from the source device to generate a plurality of live feeds. The live media content switching system 102 may store such plurality of live input streams and corresponding live input stream manifests in a content delivery system. Upon receiving a request from a consumer device, such as the first consumer device 110a, the stream selection service 142 may determine which of a plurality of disparate live media output streams should be joined, based at least on a geographical location of the first consumer device 110a, consumer preferences, and service level. In accordance with an embodiment, the switch logic manager 112 may be configured to generate a programming schedule based on a plurality of live input stream schedules, a plurality of rights and preferences, data supplied from a stream owner/operator, and one or more content parameters.

The indexing and storage system 116 may retrieve the plurality of live input streams from the content delivery system. The indexing and storage system 116 may index the plurality of live input stream manifests associated with encoded and packaged plurality of live input streams enlisted in the programming schedule generated by the switch logic manager 112.

Once indexed, the stream publishing engine 114 may receive the programming schedule for the channel from the switch logic manager 112, based on a request from the first client device 132a to join a channel for viewing a live stream. The stream publishing engine 114 may identify one or more events in a first live input stream manifest of the plurality of live input stream manifests. Based on the identification of the one or more events, the stream publishing engine 114 may insert information related to a plurality of first media segments and the one or more events from a first live input stream into the disparate live output stream manifest based on the programming schedule.

The stream publishing engine 114 may generate the disparate live media output stream, based on the insertion of the information related to the media segments from the first live input stream indicated in the first live input media manifest. The stream publishing engine 114 may transition, by a first transition of (or switch) the first live input stream to the first disparate live media output stream. The transition may be based on insertion of plurality of media segments from the first live input stream manifest into the first disparate live media output stream manifest. The stream publishing engine 114 may insert information related to a plurality of second media segments and one or more events from a second live input stream indicated in a second live input stream manifest into the first disparate live output stream manifest based on an updated programming schedule.

The stream publishing engine 114 may transition, by a second transition of (or switch) the second live input stream. The second transition may be based on the insertion of the plurality of second media segments indicated in the second live input stream manifest to the first disparate live output stream manifest, media content corresponding to the one or more events in the second live input stream and other live input streams.

Upon receiving a request from the user to join a disparate live media output stream, the media player in the consumer device, such as the first consumer device 110a, may receive live input streams currently being published in the first disparate live media output stream manifest and next programming content. Such first disparate live media output stream manifest may be generated by the stream publishing engine 114 based on the programming schedule 111 generated by the switch logic manager 112 based on one or more content parameters, as described above. In an embodiment, the first consumer device 110a may call the program guide service to discover which disparate media output stream is currently being playing on a specific channel and what disparate media output stream is coming up next.

In accordance with another embodiment, the media player in the consumer device 110a may receive a recommendation for a preferred disparate live media output stream based on one or more of regional contents rights, media content rights, regional consumer preferences, individual consumer preferences, and individual consumer service subscription level data generated by the stream selection service. Accordingly, the user may select the recommended disparate live media output stream and the user selection is transmitted to the stream selection service that is stored in a schedules, rights, and preferences database.

Accordingly, the media player in the first consumer device 110a may playout the first disparate live media output stream manifest and generate the first disparate live media output stream viewed by the user at the first consumer device 110a. During media content playout by the media player at the first consumer device 110a, upon identification of the one or more events, various requests may be generated by the first consumer device 110a for retrieval of non-programming content to a non-programming content proxy server when pre-encoded place holder content segments for a scheduled duration of one or more non-programming content breaks, as defined by the programming schedule, is encountered in the first disparate live media output stream manifest. For example, for ad break tags, the first consumer device 110a may replace the slate segments from the stream publishing engine 114 with the ad segments returned from the ad decisioning server 106a (may also be a proxy replacing the slate content segments with the ad content segments).

Subsequently, based on the identification of the one or more events in the first live input stream, interaction of the user with the one or more events, a geographical location of the first consumer device 110a, consumer preferences, and service level, the programming schedule may be updated. Accordingly, the stream publishing engine 114 may update the first disparate live media output stream manifest. Accordingly, an updated first disparate live media output stream may be generated, which includes media segments from mutually switched multiple live input streams, viewed by the user at the first consumer device 110a.

Thus, upon joining the first disparate live media output stream, the first consumer device 110a typically stays connected to the first disparate live media output stream. The required stream is switched by the stream publishing engine 114. This provides for a smooth transition between different live input streams without the media player having to re-buffer.

In accordance with some embodiments, multiple live input streams may have equal weighting based on the available criteria and content parameters, and the user is presented an option and may act to switch to a second disparate live media output stream. Such interaction, for example, action or inaction, may be recorded in user preferences by the stream selection service to inform future decisions.

FIG. 1B is a block diagram that illustrates an exemplary live media content switching system for publishing a disparate live media output stream using live input streams, in accordance with an exemplary embodiment of the disclosure. Referring to FIG. 1B, the live media content switching system 102 may further comprise. There are shown the switch logic manager 112, the stream publishing engine 114, and the indexing and storage system 116 provided in the live media content switching system 102, as described in FIG. 1A. There is also shown an Ad decisioning server 106a, a plurality of live feeds 124a, . . . , 124n, a plurality of live stream encoder/packagers 126a, . . . , 126n, and a plurality of live input streams 128a, . . . , 128n. There are also shown a content delivery system 130, which is an example of the network 108, client devices 132a, . . . , 132n, which correspond to the plurality of consumer devices 110a, . . . , 110n, and users 134a and 134b associated with the client devices 132a and 132n. There are further shown an Geo location service 136, a proxy server 138, and a program guide service 140, a stream selection service 142, a stream owner/operator 144, a schedules, rights, and preferences database 146 including one or more content parameters, such as content rights 148, user preferences 150, regional preferences 152, live schedules 154, and regional rights 156. The generation of the programming schedule 111 for each disparate live media output stream may be further based on the stream owner/operator 144, which may further include a preferences database 144A, a requirement database 144B, and a consumer database 144C.

In some embodiments of the disclosure, the switch logic manager 112, the stream publishing engine 114, the indexing and storage system 116, and the stream selection service 142 may be integrated to form an integrated system. In some embodiments of the disclosure, as shown, the switch logic manager 112, the stream publishing engine 114, the indexing and storage system 116, and the stream selection service 142 may be distinct. Other separation and/or combination of the various entities of the exemplary live media content switching system 102 illustrated in FIG. 1B may be done without departing from the spirit and scope of the various embodiments of the disclosure.

The plurality of live feeds 124a, . . . , 124n may correspond to live content segments of one or more media feeds of channels, such as a live feed of a CNN channel. The media feed of a channel may correspond to a live broadcast feed or a live regional feed generated by source devices 118.

The plurality of live stream encoder/packagers 126a, . . . , 126n may comprise suitable logic, circuitry, and interfaces that may be configured to execute code to receive the plurality of live feeds 124a, . . . , 124n from source devices 118. The plurality of live stream encoder/packagers 126a, . . . , 126n may encode and package the plurality of live feeds 124a, . . . , 124n into the plurality of live input streams 128a, . . . , 128n, in specific formats ready for delivery to the client devices 132a, . . . , 132n. Each of the plurality of live input streams 128a, . . . , 128n may comprise plurality of media segments transcoded to a different type of stream for different types of device, such as a TV or a mobile device, and marked with Nielson markers. The plurality of live stream encoder/packagers 126a, . . . , 126n may be configured to generate a plurality of live input stream manifests corresponding to the each of the plurality of live input streams 128a, . . . , 128n. Various formats of the plurality of live input stream manifests or playlists, may be, but are not limited to DASH and HLS. Such live input streams and corresponding live input stream manifests may be transmitted to a content delivery system.

The plurality of live input streams 128a, . . . , 128n may correspond to a format of media stream that may be transmitted to the content delivery system 130 to be indexed by the indexing and storage system 116 to prepare for media distribution, for example, web distribution. Various media container formats of the live media content may include, but are not limited to, transport stream (TS), fragmented MP4 (fMP4), Common Media Application Format (CMAF) and the like. For each of such plurality of live input streams 128a, . . . , 128n, there may exist a live schedule comprising metadata (such as time of start, duration and the like), stored in the database, live schedules 154.

The content delivery system 130 may correspond to the network 108, described in FIG. 1. The content delivery system 130 may comprise networks configured for distributing media content to the plurality of client devices 132a, . . . , 132n. Generally, the term "content," "metadata," "media," and similar words are used interchangeably to refer to any type of media —audio, videos, datacasts, music, text, images, graphics, articles, photos, photo galleries, video galleries, infographics, maps, polls, guest biographies, tweets or other social media, blog posts, and/or the like. The content delivery system 130 may be configured to provide disparate live media output streams to the plurality of client devices 132a, . . . , 132n, via a transport stream, segmented streaming, progressive download, or any other modes of distributing a multimedia presentation, such as via an over-the-air content delivery/distribution network, a linear content delivery/distribution network, a cable content delivery/distribution network, a satellite content delivery/distribution network, an Internet Protocol (IP) based content delivery/distribution network, and/or the like.

The client devices 132a, . . . , 132n may correspond to consumer devices 110a, . . . , 110n. In accordance with an embodiment, the client devices 132a, . . . , 132n may be content recognition (CR)-enabled devices, such as automatic content recognition enabled devices. The client devices 132a, . . . , 132n may be configured to communicate with the Ad decisioning server 106a and/or the proxy server 138, via the content delivery system 130, or a separate communication network. The client devices 132a and 132n may be associated with users 134a and 134b, respectively.

The Geo location service 136 may comprise suitable logic, circuitry, and interfaces that may be configured to provide services to the stream selection service 142 for mapping an IP address of a client device to a geolocation. The Geo location service 136 may further test for usage of a virtual private network for enforcing regional blackouts on one or more client devices that do not support natively collecting and providing the geolocation.

The proxy server 138 may comprise suitable logic, circuitry, and interfaces that may be configured to execute code to communicate with the client devices 132a, . . . , 132n. In accordance with an embodiment, the proxy server 138 may receive requests from the client devices 132a, . . . , 132n when the client devices 132a, . . . , 132n generate requests for the Ad decisioning server 106a whenever the client devices 132a, . . . , 132n encounter, for example, an advertisement break tag or an overlay tag. In such cases, the proxy server 138 may generate requests to the Ad decisioning server 106a for the advertisements on behalf of the client devices 132a, . . . , 132n. In another embodiment, the proxy server 138 may receive the manifest form the content delivery system 130 and may deliver the manifest to the client devices 132a, . . . , 132n based on one or more client requests. The proxy server 138 may be configured to detect for example break indicators, and call the Ad decisioning server 106a, replace the filler media segments in the manifest and then deliver the modified manifest to the client devices 132a, . . . , 132n. In an embodiment, the proxy server 138 may be used for one or more client devices of the plurality of client devices 132a, ..., 132n where the media player is fully controlled by a third party and does not support ad insertion. In such embodiment, ad blocking may be reduced which usually targets communication between the plurality of client devices 132a, ..., 132n and the Ad decisioning server 106a. Further, the proxy server 138 may replace the pre-encoded placeholder content segments, such as slate content segments, with the advertisement content segments received from the Ad decisioning server 106a.

The program guide service 140 may comprise suitable logic, circuitry, and interfaces that may be configured to execute code to provide a time accurate listing of which programming content is currently playing on each of the generated channels and broadcast channels as well as if experiences, like program restart, are available for a program.

The stream selection service 142 may comprise suitable logic, circuitry, and interfaces that may be configured to provide a client device, for example, the first client device 132a, requesting to view a disparate live media output stream with a correct variant of disparate live media output stream, based on the geolocation and identification of the first client device 132a, along with data retrieved from the schedules, rights, and preferences databases 146. The stream selection service 142 may further receive a user selection that corresponds to a selection of a first user 134a associated with the first client device 132a to view the recommended/desired disparate live media output stream on the first client device 132a. The stream selection service 142 may further store the received selection in the schedules, rights, and preferences databases 146, and also communicates to the switch logic manager 112 and the stream publishing engine 114. The stream selection service 142 acts as an interface between the switch logic manager 112 of the live media content switching system 102 and the plurality of consumer devices 110a, ..., 110n, such as the first client device 132a.

The stream owner/operator 144 may comprise suitable logic, circuitry, and interfaces that may be configured to provide one or more parameters to the switch logic manager 112 regarding contractual content requirements for specific locations, and historical knowledge of location preferences. The stream owner/operator 144 may further provide data to the switch logic manager 112 about how to handle non-programming content breaks, whether to insert non-programming content between media switches, how the transition between events may be executed, whether a network logo needs to be displayed and if so how often. The stream owner/operator 144 may further provide data, such as consumer data (for example, billing Zip code), and special service level tiers. Additionally, the stream owner/operator 144 may further provide content parameters, for example, regarding the types of channels to be generated (theme, genre, title, and the like), the number of advertisement breaks per hour, and duration of such advertisement breaks.

The schedules, rights, and preferences database 146 may comprise suitable logic, circuitry, and interfaces that may be configured to execute code to store content rights 148, user preferences 150, regional preferences 152, live schedules 154, and regional rights 156. For example, content rights 148 may store availability and platform rights for live input streams in the programming schedules, such as the programming schedule 111, the user preferences 150 may store individual client viewing preferences, the regional preferences 152 may store regional viewing preferences, the live schedules 154 may store the schedules for all live input streams, and the regional rights 156 may store regional blackout zones for the various sports leagues, for example. The schedules, rights, and preferences database 146 may further store data supplied from the stream owner/operator 144 including requirements, preferences, such as pre-defined location-based viewing preferences, stream transition rules, and any required client data, such as service level and zip code.

In operation, in accordance with an embodiment, the plurality of live stream encoder/packagers 126a, ..., 126n may be configured to encode and package the respective live feeds received from corresponding source devices. Consequently, the plurality of live input streams 128a, ..., 128n and corresponding live input stream manifests may be generated by the plurality of live stream encoder/packagers 126a, ..., 126n for media distribution, for example, web distribution. Various formats of the plurality of live input stream manifests or playlists may be, but are not limited to DASH and HLS. Such plurality of live input streams 128a, ..., 128n and corresponding live input stream manifests may be transmitted to the content delivery system 130.

In an embodiment, the switch logic manager 112 may be configured to generate the programming schedule 111 by leveraging various live input stream schedules, regional and content rights, regional preferences, user preferences, and data supplied from the stream owner/operator, referred to as one or more content parameters. The switch logic manager 112 may further generate a first switching schedule for generating a first disparate live media output stream. The first switching schedule for the first generated first disparate live media output stream may define a first transition and a second transition corresponding to at least switching between plurality of live input streams 128a, ..., 128n and the first disparate live media output stream at scheduled time stamps. Thus, the first switching schedule may be based on the programming schedule 111, defining a first transition window and switch after program end message in a first live input stream 128a, defining a second transition window and switch only after a program start message on the second live input stream 128b, or defining a third transition window and switch after the program end message on the first live input stream 128a and insert the second live input stream 128b at a program start message. The switch logic manager 112 may be further configured to determine the required number of multiple disparate live media output streams and generates the programming schedule 111 for each disparate live media output stream based on the schedules, rights, and preferences database 146, and data (such as preferences, requirements, and consumer data) received from stream owner/operator 144.

In accordance with another embodiment, upon receiving a request from a client device, such as the first client device 132a, to join a channel for viewing a live stream, a stream selection service 142 may be configured to present a list of available disparate live media output streams and programming content published for each disparate live media output stream. In various embodiments, the list may be determined based on, for example, geographical location of the client device, such as the first client device 132a, regional contents rights, media content rights, regional consumer preferences, individual consumer preferences, individual consumer service subscription level data, availability of multiple disparate live media output streams, and service level.

The stream selection service 142 may be further configured to access a program guide service 140 to present the list of available disparate live media output streams and programming content published for each disparate live media output stream. Based on a selection provided by a user of client device, such as the first client device 132a, the programming schedule 111 may be updated and provided to the stream publishing engine 114. The stream selection service 142 may be further configured to access the Geo location service 136 that may map an IP address of the client device, such as the first client device 132a, to a geolocation. Accordingly, the stream selection service 142 may test for usage of a virtual private network for enforcing regional blackouts on the client device, such as the first client device 132a, in case the first client device 132a does not support native collection and provision of the geolocation. The stream selection service 142 may be further configured to generate a repository of the client devices 132a, . . . , 132n and corresponding requested or preferred live media output streams in the schedules, rights, and preferences database 146.

In an embodiment, the indexing and storage system 116 may be configured to retrieve the plurality of live input streams 128a, . . . , 128n from the content delivery system 130. The indexing and storage system 116 may be configured to index the live input stream manifests associated with encoded and packaged plurality of live input streams 128a, . . . , 128n enlisted in the programming schedule 111 generated by the switch logic manager 112 or updated by the stream selection service 142. In accordance with an embodiment, the live input stream manifests may correspond to data sets that include playlists of reference addresses of corresponding plurality of live input streams 128a, . . . , 128n, information about the plurality of live input streams 128a, . . . , 128n, and one or more non-programming content, programming content or overlay indicators. The indexing by the indexing and storage system 116, may be as per the following sub-steps: (1) ingesting of the live input stream manifests associated with the plurality of live input streams 128a, . . . , 128n enlisted in the programming schedule 111, (2) indexing the media segments and various indicators from the live input stream manifests, (3) maintaining the indexed media segments and various indicators for each of the plurality of live input streams 128a, . . . , 128n for a defined duration, (4) storing the data log of the various indicators, (5) validating the completion of the plurality of live input streams 128a, . . . , 128n so that the plurality of live input streams 128a, . . . , 128n may be included in the generated disparate live media output stream, and (6) generating alerts in case the validation of the completion of the plurality of live input streams 128a, . . . , 128n fails.

The stream publishing engine 114 may be configured to receive the programming schedule 111 for the channel from the switch logic manager 112, and to identify one or more events in a first live input stream manifest of the plurality of live input stream manifests. The one or more events may correspond to the various indicators in the first live input stream manifest or in-band indicators in the first live input stream 128a. Based on the identification of the one or more events and the programming schedule 111, the stream publishing engine 114 may be configured to insert information related to first media segments and the one or more events from the first live input stream 128a indicated in corresponding first live input stream manifest into a first disparate live output stream manifest. In other words, when the stream publishing engine 114 comes across tags or break points marking an ad break, in the first live input stream manifest, the stream publishing engine 114 may insert such tags or break points in the disparate live output stream manifest based on the programming schedule 111. The stream publishing engine 114 may be further configured to insert one or more overlay indicators, which are independent of the first live input stream 128a, at defined time stamps in the generated disparate live media output stream based on the received programming schedule 111. Thus, the stream publishing engine 114 may be configured to generate the first disparate live media output stream. The first disparate live media output stream manifest may correspond to a data set that includes playlists of the first live input stream 128a, information about the first live input stream 128a, one or more overlay opportunities, and duration of a set of non-programming content breaks within the first live input stream 128a. Accordingly, a first disparate live media output stream, corresponding to the first live input stream 128a requested and to be viewed by the client device, such as the first client device 132a, may be generated for the channel via the media player based on the disparate live media output stream manifest.

While generating the first disparate live media output stream based on the first disparate live media output stream manifest, according to the first switching schedule for the first disparate live media output stream, transition, by a first transition of the first live input stream in the first disparate live media output stream, based on the one or more events.

In accordance with an embodiment, adherence to applicable blackout and/or local preference requirements within the region corresponding to geolocation of the client device (such as the client device 132a) may be required. In such cases, the stream publishing engine 114 may be configured to insert information related to the plurality of second media segments and one or more events from the second live input stream 128b indicated in the second live input stream manifest into the first disparate live output stream manifest based on the updated programming schedule 111. As described above, the programming schedule 111 may be updated based the identification of the one or more events in the first live input stream 128a, interaction of the user with the one or more events, based at least on a geographical location of the client device (such as the client device 132a), client preferences, and service level, and the like. Thus, the first switching schedule in the updated programming schedule 111 (for the first disparate live output stream manifest) may define both the first transition and the second transition corresponding to at least switching between the first live input stream 128a, the second live input stream 128b, and the first disparate live media output stream at scheduled time stamps. Thus, the stream publishing engine 114 may be configured to transition, by the second transition of the second live input stream 128b, based on the insertion of the second media segments indicated in the second live input stream manifest to the first disparate live output stream manifest and media content corresponding to the one or more events in the second live input stream 128b and other live input streams.

Thus, based on the updated first disparate live output stream manifest, the media player switches between various live input stream manifests corresponding to at least two live input streams, for example corresponding to a broadcast channel and a regional channel, and accordingly, the user may view corresponding updated first disparate live media output stream at the client device (such as the client device 132a).

In accordance with various embodiments, the live media content switching system 102 may provide support for a manual override to a different live input stream if the programming schedule 111 is incorrect and was not corrected prior to the execution of the switch. The live media content switching system 102 may further facilitate insertion of filler media content segments (for example, slates) during the ad break locations based on the declared break duration in the live input stream, in case the live input stream has burned-in ads and the stream owner/operator 144 supports digital ad insertion. The live media content switching system 102 may further facilitate inserting of additional information in the manifest to help the media player transition smoothly between media content from different live input streams, including but are not limited to, discontinuity tags. The live media content switching system 102 may further support a plurality of digital rights management indicators in the plurality of disparate live media output streams, maintain accurate program timing for the disparate live media output streams, and recover from a failure and not allow restricted content to be delivered to the clients/consumers. The live media content switching system 102 may further provide as-run data for each disparate live media output stream of the plurality of disparate live media output streams to the program guide service 140. The as-run data may indicate a timing deviation between the generated programming schedule 111 and the playout of the plurality of disparate live media output streams manifests published in the content delivery system 130.

In accordance with various embodiments, a plurality of disparate live media output streams generated in a similar manner as the first disparate live media output stream, may be generated with very low investment. In addition to providing unlimited number of disparate live media output streams based on limited live input streams (or source streams), the live media content switching system 102 may provide consumers/clients more targeted choices than currently available with traditional national or regional broadcast networks. In an embodiment, the live media content switching system 102 facilitates zip code level targeting. For example, the switch logic manager 112 may switch between multiple regional sports networks to provide an event that matches the consumer/client at a zip code level versus some broader region, TV direct market area or a headend level. In another embodiment, the live media content switching system 102 facilitates smaller event blackouts. For example, the stream owner/operator 144 may limit event blackouts only to the required geolocations instead of larger geographic regions based on traditional distribution schemes, such as broadcast delivery. In another embodiment, the live media content switching system 102 supports competing simultaneous events. For example, a National news network may deliver/offer coverage of concurrent campaign speeches from opposing candidates based on consumer preferences. In another embodiment, the live media content switching system 102 supports full event coverage. For example, an event may be made available in its entirety while it is also covered in a more traditional way with cutaways for, for example, pundit commentary while the event is relegated to the background. Such examples have been described with illustrations in FIGS. 4A to 4C.

Figure 2:
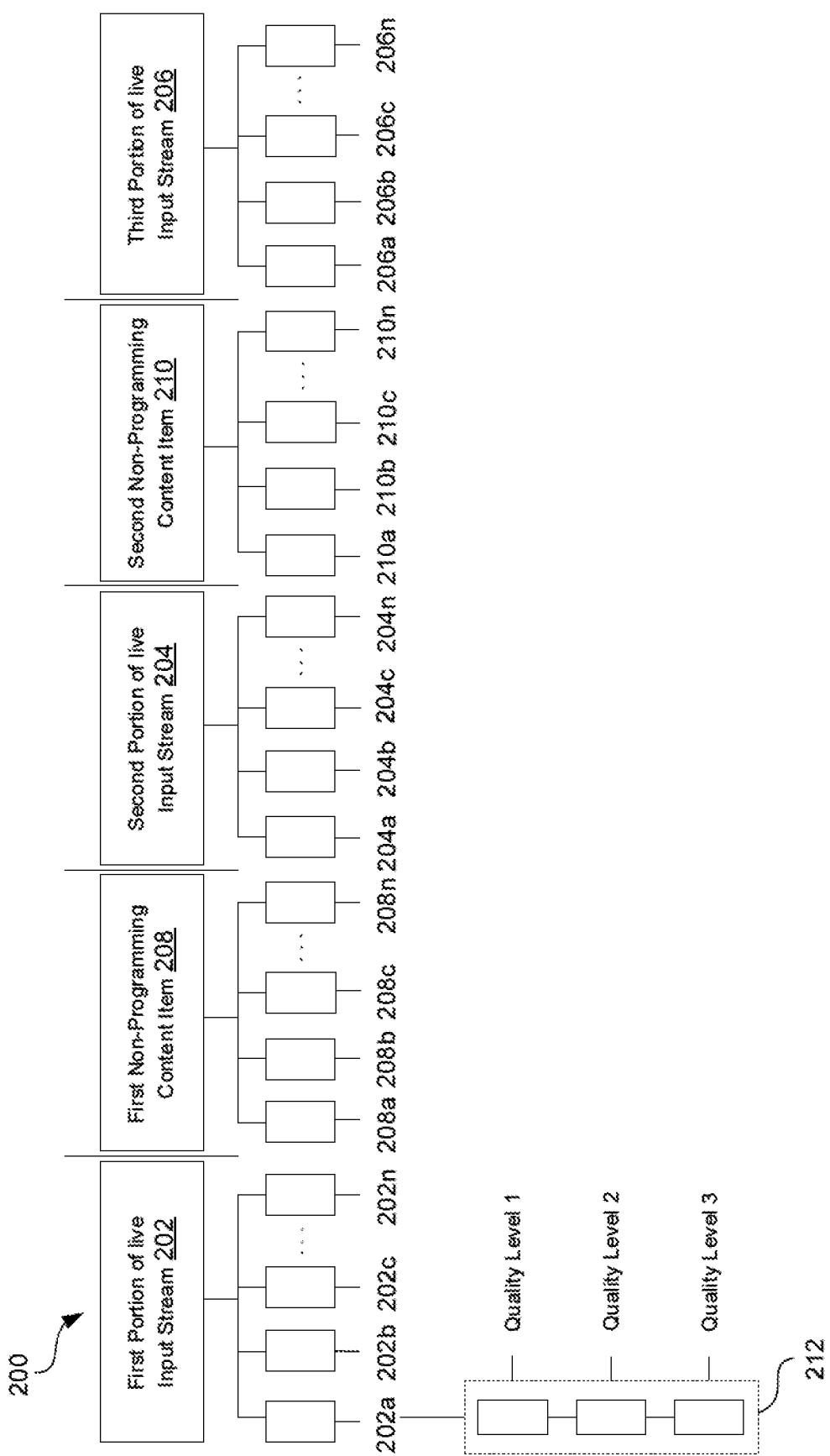
FIG. 2 illustrates segmentation of live input streams for a programming schedule for publishing disparate live media output streams using live input streams by the live media content switching system of FIG. 1B, in accordance with an exemplary embodiment of the disclosure.

FIG. 2 illustrates segmentation of live media streams for a programming schedule in a framework for publishing a disparate live media output stream using live media streams by live media content switching system 102 of FIG. 1B, in accordance with an exemplary embodiment of the disclosure. FIG. 2 also illustrates an exemplary arrangement of live input streams in accordance with a programming schedule 111. Referring to the exemplary arrangement of FIG. 2, there are shown a first portion of live input stream 202, a second portion of live input stream 204, and a third portion of live input stream 206. There is also shown a first non-programming content item 208 scheduled after the first portion of live input stream 202, and a second non-programming content item 210 scheduled after the second portion of live input stream 204. Each portion of live input streams 202, 204, and 206 may correspond to a live input stream, such as the first live input stream 128a, and may be stored in the content delivery system 130 in segments or other forms. For example, the first portion of live input stream 202 may be segmented into a plurality of first media segments 202a, 202b, 202c, . . . , 202n. Similarly, the second portion of live input stream 204 and the third portion of live input stream 206 may also be segmented into a plurality of second media segments 204a, 204b, 204c, . . . , 204n, and a plurality of third media segments 206a, 206b, 206c, . . . , 206n respectively.

By way of example, the segmentation may be executed by the plurality of live stream encoder/packagers 126a, . . . , 126n during a preparation stage of the live input streams. The encode stage may create various quality levels and the package stage segments the content into the short segments, and produces the correct format, such as TS, fMP4, or CMAF and encrypts the media content to prevent piracy. In accordance with an embodiment, all the segments of the plurality of first media segments 202a, 202b, 202c, . . . , 202n, the plurality of second media segments 204a, 204b, 204c, . . . , 204n, and the plurality of third media segments 206a, 206b, 206c, . . . , 206n, may be segmented into consistent length, for example, 10 seconds segments. It may be advantageous to have a consistent and smaller size segments to be able to quickly push to the content delivery system 130, and also for smooth playout by a media player at the end-user side, such as on the plurality of consumer devices 110a, . . . , 110n.

During the preparation stage of the live input streams by the plurality of live stream encoder/packagers 126a, . . . , 126n, an optimum size (or length) of segments may be determined by the segmentation system based on resolution and bitrate of the plurality of consumer devices 110a, . . . , 110n. Smaller chunks or segments of live input streams may be difficult to manage as the amount of metadata associated with them may increase, whereas larger chunks or segments may be difficult to communicate by the live media content switching system 102 and also to be played out by the media player so as to maintain an adequate buffer for consistent streaming and playback at the media player. Thus, an optimal size of segments may be determined. It is to be understood by those skilled in the art that various changes may be made and segments of different file sizes (or length) may be used without departure from the scope of the present disclosure. Further, it should be recognized by one skilled in the art that other streaming protocols may require a different processing of media content. Thus, the scope of the disclosure should not be limited to the processing or preparation of media content to allow delivery using different delivery methods, streaming protocols, or distribution system, known in the art. Further, instead of the same live input stream, as shown, live content segments from other live input streams may be arranged after, in between, or prior to a live input stream or a non-programming content item to enable switching in live streaming. The insertion of the live content segments may be done on-the-fly based on dynamic scheduling and manifest manipulation. The insertion of live media streams and media content, may be driven by real time or near-real time content context analysis, user-selection on the consumer devices 110a, . . . , 110n, or driven by external data received from the external data source 120. The switch logic manager 112 in association with the stream publishing engine 114 (also referred to as a stream manipulator) may be configured to insert live input streams, in an existing program stream based on manipulation of a manifest of an existing live input streams, on an existing channel.

In accordance with an embodiment, each segment of the plurality of first media segments 202a, 202b, 202c, . . . , 202n, the plurality of second media segments 204a, 204b, 204c, . . . , 204n, and the plurality of third media segments 206a, 206b, 206c, . . . , 206n, may be further processed to be stored at various quality levels, and content encryption modes for the purposes of adaptive bitrate streaming and digital rights management, for example, the media segment 202a may be stored in a plurality of quality levels, for example, high definition (HD), high dynamic range (HDR) video, or different quality levels in accordance with specified pixel resolutions, bitrates, resolutions, bandwidths, frame rates, and/or sample frequencies. As each of the portions of the first live input streams, such as the 202 to 206, are segmented, indexed and stored in the plurality of quality levels in the indexing and storage system 116, the portions of the first live input streams, such as 202 to 206, may be re-used to create new channels, such as new program streams, without requiring to re-encode live input streams when a new program stream is created using same live input streams.

For the sake of brevity, and with reference to FIG. 2, there is shown an example of media packaging for adaptive streaming using certain protocols or streaming methods for at least one delivery method of the distribution system. It is to be understood that media packaging for different delivery methods (such as analog terrestrial broadcast, digital terrestrial broadcast, direct-to-home satellite broadcast, cable, other Internet Protocol (IP)-based delivery methods, over-the-top television (OTT)), different streaming protocols, or distribution system, may be different. The media content may be prepared to be viewed on one or more consumer devices of the plurality of consumer devices 110a, . . . , 110n, based on at least the profile, desired delivery method, delivery conditions, and content protection requirements, to satisfy operational and technical requirements, as needed. The operational and technical requirements may include, but are not limited to, media encoding, media segmentation, programming schedule 111 (or manifest) creation or manipulation requirements, geographical and content restrictions, desired media encryption, and/or metadata signaling requirements. For example, in certain scenarios and for certain media content delivery methods, network bandwidth, network conditions, or device-type where media content is to be consumed may not be variable or known in advance. In such a case, creating different quality levels for a same live input stream may not be required. Further, based on different operational and technical requirements, live content switching or the arrangement of live input streams or other content in a program stream may be different. The media content that is prepared and distributed may include both the programming content, such as long-form presentations, short-form presentations, news or sporting events; and non-programming content, such as paid advertisements, public service advertisements, overlay indicators, or promotional material.

Figure 3:
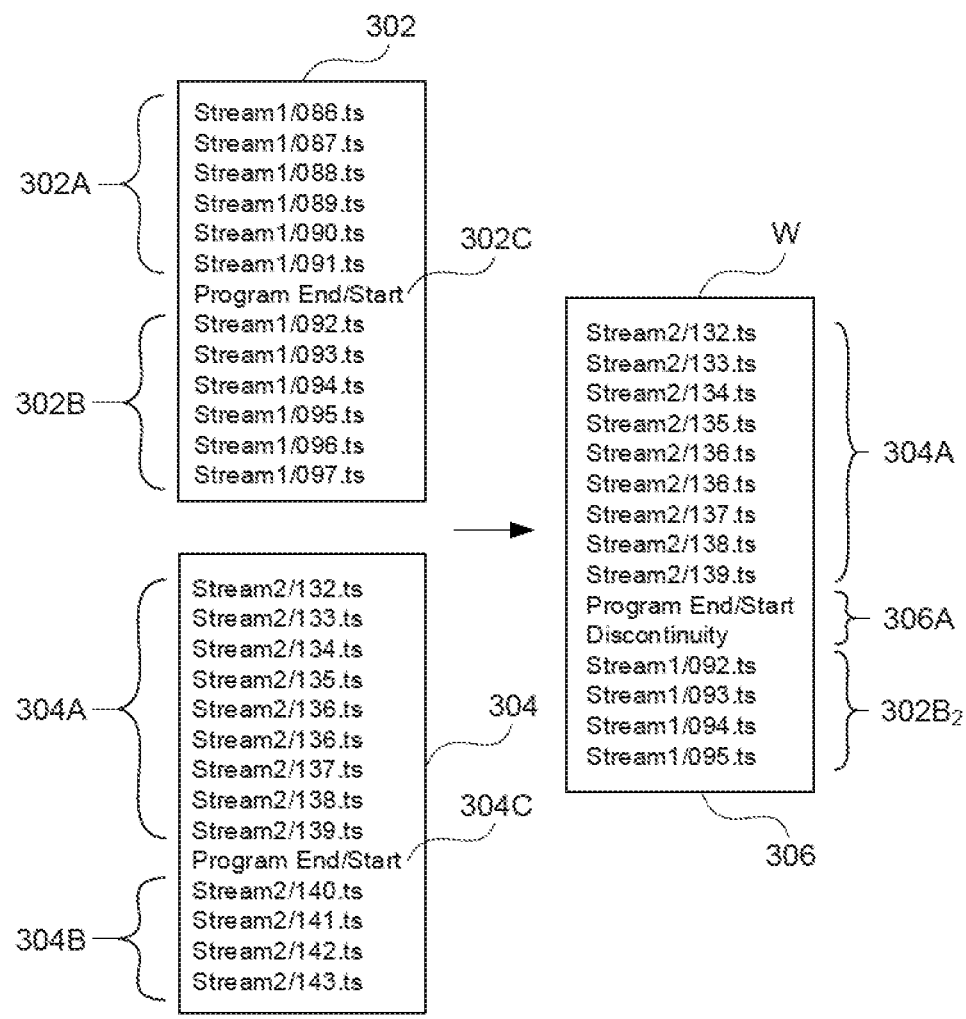
FIG. 3 illustrates a first exemplary scenario associated with publishing a disparate live media output stream using live input streams using two live input streams by the live media content switching system of FIG. 1B, in accordance with an exemplary embodiment of the disclosure.

FIG. 3 illustrates a first exemplary scenario associated with publishing of a disparate live media output stream using two live input streams by the live media content switching system 102 of FIG. 1B, in accordance with an exemplary embodiment of the disclosure. Referring to the exemplary scenario of FIG. 3, there are shown a first live input stream manifest 302, a second live input stream manifest 304, and a disparate live media output stream manifest 306.

The first live input stream manifest 302 and the second live input stream manifest 304 may be encoded live input stream manifest listed in the programming schedule 111, and retrieved from the indexing and storage system 116. The format of the first live input stream manifest 302 and the second live input stream manifest 304 may be, for example DASH, HLS, or other such format. Further, the format of the first live input stream 128a and the second live input stream 128b corresponding to the first live input stream manifest 302 and the second live input stream manifest 304, respectively, may be TS, fMP4, CMAF, or other such format.

The first live input stream manifest 302 is shown to be including a plurality of first media segments 302A and 302B and a program end tag 302C. The second live input stream manifest 304 is shown to be including a plurality of second media segments 304A and 304B and a program end tag 304C.

The stream publishing engine 114 may be configured to insert information related to the plurality of second media segments 304A in the second live input stream manifest 304 to the disparate live media output stream manifest 306. The stream publishing engine 114 may be configured to insert a program end tag and additional information, such as but are not limited to a discontinuity tag, collectively indicated as 306A, in the disparate live media output stream manifest 306 to facilitate an integrated media player of the first client device 132a to transition smoothly between media content from different sources, for example, the first live input stream 128a and the second live input stream 128b.

The stream publishing engine 114 may be further configured to insert information related to the plurality of first media segments 302B, indicated in the first live input stream manifest 304. The stream publishing engine 114 may be configured to insert such information in the disparate live media output stream manifest 306 at defined intervals. Thereafter, the stream publishing engine 114 may publish the disparate live media output stream manifest 306 in the content delivery system 130.

The client device, such as the first client device 132a, receives the manipulated manifest, for example, the disparate live media output stream manifest 306, from the content delivery system 130, and the integrated media player may read information from the disparate live media output stream manifest 306 to acquire the defined media content. As illustrated in FIG. 3, the integrated media player may read information from the disparate live media output stream manifest 306 in a rolling window W to acquire the defined media content, such as the plurality of second media segments 304A from the second live input stream manifest 304 and one or more first segments $302B_1$ from the first live input stream manifest 302. Accordingly, the first user 134a associated with the first client device 132a may view the disparate live media output stream generated based on the disparate live media output stream manifest 306.

FIGS. 4A to 4C illustrate various second exemplary scenarios associated with playout of disparate live media output streams published in FIG. 3, in accordance with an exemplary embodiment of the disclosure. Referring to FIG. 4A, the exemplary scenario 400A relates to a use case for providing multiple targeted disparate live media output stream manifests 402 to 406 based on two live input streams corresponding to two live input stream manifests 408 and 410 from two regional networks. For example, "35" regional sports networks may be leveraged to better address much more than "210" television direct market areas (DMAs), for example "600" television DMAs, due to the capability of creation any number of disparate live media output stream manifests, and thus, any number of disparate live media output stream manifests. Many of such DMAs cross between two or more regional sports networks. Thus, the live input streams may be switched between each other to generate personalized media stream manifests based on a defined criterion, for example, geography. For example, "Boston" and "New York" fans living in "Southeast" prefer games from "Northeast" network. Based on content rights, audience segments may be created inside geographies.

Referring to the exemplary scenario 400A, there are shown two live input stream manifests 408 and 410 corresponding to two regional networks. The two live input stream manifests 408 and 410, associated with the two live input streams, correspond to three events being streamed in respective geographical areas. The first disparate live media output stream manifest 402 may be generated based on a first programming schedule defining a first switching at schedule time "T1" between the first event from the first live input stream manifest 408 and a second event from the second live input stream manifest 410. The first programming schedule further defines a second switching at schedule time "T2" between the second event from the second live input stream manifest 410 and the third event from the first live input stream manifest 408.

Further, the second disparate live media output stream manifest 404 may be generated based on a second programming schedule defining a switching between the first two events from the second live input stream manifest 410 and, at schedule time "T1", switching to the third event from the first live input stream manifest 408.

Further, the third disparate live media output stream manifest 406 may be generated based on a third programming schedule defining a first switching at schedule time "T1" between the first event from the second live input stream manifest 410 and the second event from the first live input stream manifest 408. The third programming schedule further defines a second switching at schedule time "T1" between the second event from the first live input stream manifest 408 and the third event from the second live input stream manifest 408.

Thus, two live input stream manifests 408 and 410 may spin off several disparate live media output streams (three of which are shown in FIG. 4A) to meet blackout and local preferences within the regions. In broadcasting, blackout refers to the non-airing of television or radio programming in a certain media market. First user 134a associated with the first client device 132a located in a first geography "G1" may be able to view a first disparate live media output stream corresponding to the first disparate live media output stream manifest 402.

Similarly, second user 134b associated with the second client device 132b located in a second geography "G2" may be able to view a second disparate live media output stream corresponding to the second disparate live media output stream manifest 404. Similarly, third user 134c associated with the third client device 132c located in a third geography "G3" may be able to view the third disparate live media output stream corresponding to the third disparate live media output stream manifest 406.

Referring to FIG. 4B, the exemplary scenario 400B relates to a use case for providing a targeted disparate live media output stream manifest 422 for events "Event 1" and "Event 2". For example, the first user 134a associated with the first client device 132a may be viewing a live media output stream corresponding to a live media output stream manifest 420. The live media output stream manifest 420 may correspond to a national feed switching at schedule time "T11" to "Event 1" associated with a first candidate. However, as per the targeted disparate live media output stream manifest 422, based on user preferences of first user 134a for a second candidate, the national feed may be switched at schedule time "T11" to coverage of live input stream of "Event 2" instead of live input stream of "Event 1". Once the live input stream of "Event 2" ends, national feed is switched back at schedule time "T12". It may be noted that the national feed may be rejoined while "Event 1" is still in progress. An alternate commentary programming along with "Event 2" may be created for a smoother switching back at schedule time "T12" to the national feed. Other viewers stay with the other candidate.

Referring to FIG. 4C, the exemplary scenario 400C relates to a use case for providing a targeted disparate live media output stream manifest 432 for extended coverage of event "Event". For example, the first user 134a associated with the first client device 132a may be viewing a live media output stream corresponding to a live media output stream manifest 430. The live media output stream manifest 430 may correspond to a national feed switching at schedule time "T21" from a program to "Event". According to the programming schedule, the "Event" is switched at schedule time "T22" to a pundit discussion and then back to the program at schedule time "T23". However, as per the targeted disparate live media output stream manifest 432, the user preferences of the first user 134a may correspond to viewing the entire coverage of "Event". Accordingly, the national feed may be switched at schedule time "T22" to the remaining coverage of live input stream of "Event 2" instead of switching to the pundit discussion. Once the live input stream of "Event" ends, national feed is switched back at schedule time "T23". Other viewers stay with the national feed and view the pundit discussion instead of the end of the event.

Figure 5A:
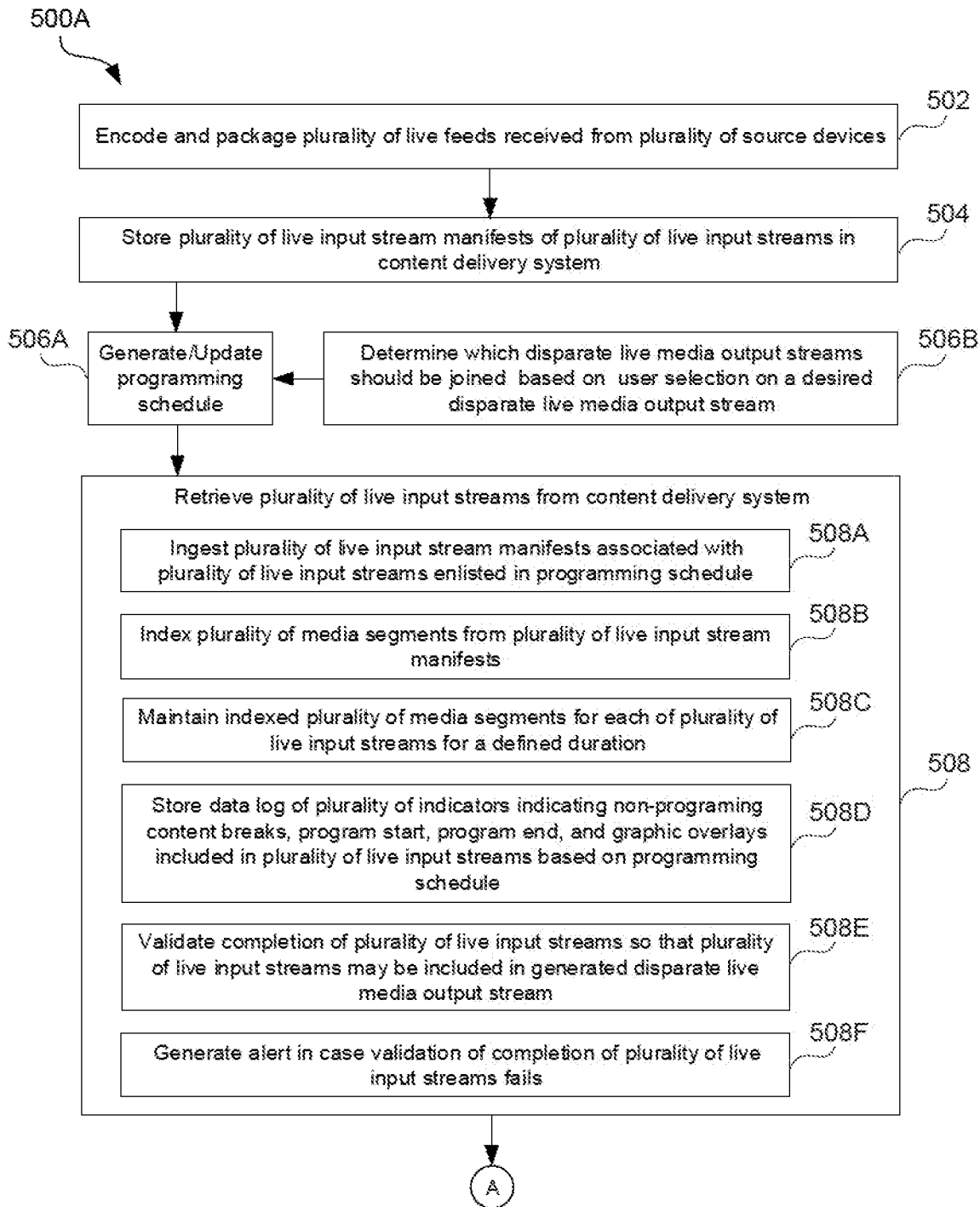
FIGS. 5A and 5B collectively depict a flowchart illustrating exemplary operations for publishing disparate live media output streams using live input streams in the live media content switching system of FIG. 1B, in accordance with an exemplary embodiment of the disclosure.
Figure 5B:
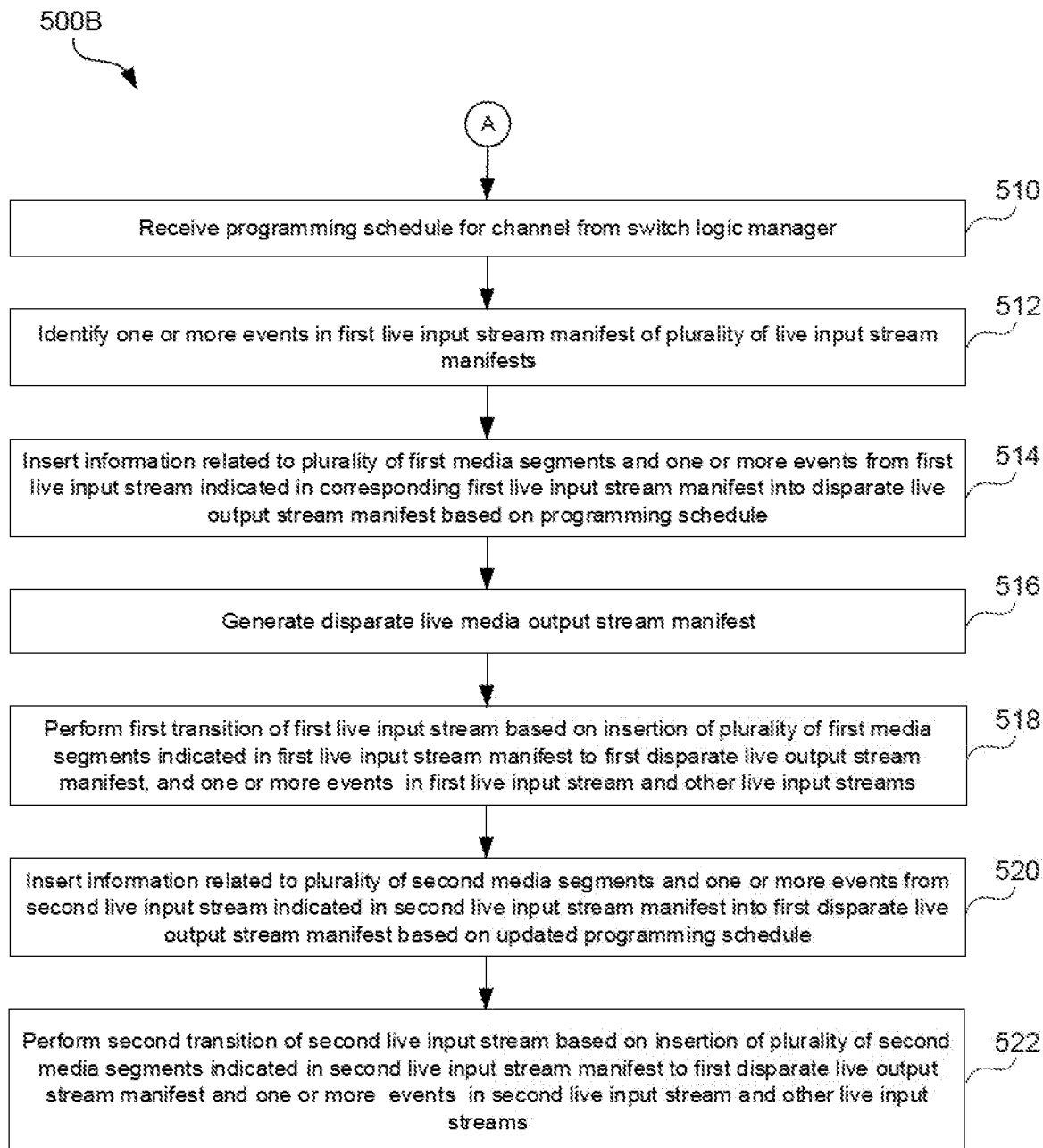

FIGS. 5A and 5B depict a flowchart illustrating exemplary operations for publishing disparate live media output streams using live input streams in the television content packaging and distribution system of FIG. 1B, in accordance with an exemplary embodiment of the disclosure. Referring to FIGS. 5A and 5B, there are shown flowcharts 500A and 500B comprising exemplary operations 502 through 508 and 510 to 522 in flowcharts 500A and 500B, respectively.

At 502, a plurality of live feeds 124a, . . . , 124n received from a plurality of source devices may be encoded and packaged. In accordance with an embodiment, the plurality of live stream encoder/packagers 126a, . . . , 126n may be configured to encode and package the plurality of live feeds 124a, . . . , 124n received from the plurality of source devices, one of which is illustrated as the source device 118 in FIG. 1A. In accordance with an embodiment, the plurality of live feeds 124a, . . . , 124n may be encoded and packaged by the plurality of live stream encoder/packagers 126a, . . . , 126n to generate a plurality of live input streams 128a, . . . , 128n for media distribution. Once the plurality of live stream encoder/packagers 126a, . . . , 126n have generated the plurality of live input streams 128a, . . . , 128n for media distribution, the plurality of live stream encoder/packagers 126a, . . . , 126n may be further configured to generate corresponding plurality of live input stream manifests. The plurality of live input stream manifests may correspond to data sets, such as text-based instruction sets, that may be utilized by the first client device 132a to determine which media segments to play and storage locations of such media segments. Various formats of the plurality of live input stream manifests or playlists may be, but are not limited to DASH and HLS. In various embodiments, the plurality of live input streams 128a, . . . , 128n, from the plurality of source devices may include broadcast and regional sports networks are encoded and packaged for web distribution.

At 504, the plurality of live input streams 128a, . . . , 128n and corresponding plurality of live input stream manifests may be stored to a content delivery system. In accordance with an embodiment, the plurality of live stream encoder/packagers 126a, . . . , 126n may be configured to store the plurality of live input stream manifests of the plurality of live input streams 128a, . . . , 128n in the content delivery system 130. In accordance with an embodiment, such plurality of live input streams 128a, . . . , 128n and plurality of live input stream manifests may be distributed to the plurality of client devices 132a, . . . 132n.

At 506A, a programming schedule may be generated or updated. In accordance with various embodiments, the switch logic manager 112 may be configured to generate or update the programming schedule 111. The switch logic manager 112 may be configured to leverage a plurality of live input stream schedules, a plurality of rights and preferences, data supplied from the stream owner/operator 144 to generate the programming schedule 111, and one or more content parameters. The generated programming schedule 111 may be for an output channel of a required number of output channels required to satisfy the various content rights, regional rights and preferences, and user preferences. The one or more content parameters may correspond to one or more of genre, demographics, geographical location of the first client device 132a, a time of viewing, content rights, individual user preferences based on previous selections and consumer account data.

In accordance with an embodiment, the switch logic manager 112 may further generate a first switching schedule for each of the plurality of disparate live media output streams. The first switching schedule for a first disparate live media output stream may define a first transition and a second transition corresponding to at least switching between the plurality of live input streams 128a, . . . , 128n, and the first disparate live media output stream at scheduled time stamps. In accordance with an embodiment, the first switching schedule may be based on the programming schedule 111, defining a first transition window and switch after program end message in the first live input stream 128a, define a second transition window and switch only after a program start message on the second live input stream 128b, or defining a third transition window and switch after the program end message on the first live input stream 128a and insert the second live input stream 124b at a program start message.

The switch logic manager 112 may be configured to determine the required number of disparate live media output streams and generates the programming schedule 111 for each disparate live media output stream based on the schedules, rights, and preferences database 146. The schedules, rights, and preferences database 146 may further include one or more content parameters, such as regional rights 156, content rights 148, live schedules 154, regional preferences 152, and user preferences 150. The generation of the programming schedule 111 for each disparate live media output stream may be further based on stream owner/operator 144, which may further include preferences database 144A, requirement database 144B, and consumer database 144C.

In accordance with an embodiment, the data provided by the stream owner/operator 144 may indicate one or more transitions between the plurality of live input streams 128a, . . . , 128n and the first disparate live media output stream. The stream owner/operator 144 may be configured to provide historical knowledge of location preferences from preferences database 144A, parameters regarding contractual content requirements for specific locations from requirement database 144B, and consumer data from the consumer database 144C. The requirement database 144B may include information related to, for example, how to handle non-programming content breaks (such as letting linear non-programming content play-through or pre-encoded place holder content segment and mark non-programming content for replacement). The requirement database 144B may further include information that may indicate or specify, for example, whether to insert non-programming content between switches, how the transition between events should be executed, and/or whether a network logo needs to be displayed and if so how often, and the like. The consumer database 144C may include information related to, for example, billing Zip code, and special service level tiers.

In other words, the stream owner/operator 144 may define how to handle transitions between the plurality of live input streams 128a, . . . , 128n and the first disparate live media output stream, by switching at the scheduled time. The stream owner/operator 144 may further define a transition window and switch only after a program end message is encountered in a current live input stream 128b, for example. The stream owner/operator 144 may further define a transition window and switch only after a program start message on a new live input stream 128c, for example. The stream owner/operator 144 may further define a transition window and switch only after a program end message on the current live input stream 128b but join the new live input stream 128c back in a buffer at the program start message so no content is missed (although the new live input stream 128c may be slightly delayed). Thus, the live media content switching system 102 may be configured to detail the transition logic for each switch between the plurality of live input streams 128a, . . . , 128n and the first disparate live media output stream according to determination by the stream owner/operator 144 for providing the best consumer experience.

In accordance with an embodiment, the stream owner/operator 144 may be configured to provide support for review and editing of the programming schedule 111. Accordingly, the stream owner/operator 144 may provide final approval workflow prior to publish of the programming schedule 111 and generation of a plurality of disparate live media output streams. In accordance with another embodiment, the stream owner/operator 144 may be configured to provide support for update and re-publish of the programming schedule 111 once the programming schedule 111 is published.

The programming schedule 111 may correspond to the plurality of live input stream manifests associated with the plurality of live input streams 128a, . . . , 128n. In certain instances, the plurality of live input streams 128a, . . . , 128n may be available for usage based on schedules, rights, and preferences database 146, however, in other instances, the plurality of live input streams 128a, . . . , 128n may be not be available for usage based on schedules, rights, and preferences database 146.

The programming schedule 111 generated by the switch logic manager 112, provides the live media content switching system 102 with the capability to present relevant eligible live content for a required theme, genre, title, series, schedule duration, and the like, based on the schedules, rights, and preferences database 146 and stream owner/operator 144.

In accordance with an embodiment, programming schedule 111 may also define a plurality of indicators (for example, non-programming content indicators, program indicators, and overlay indicators) indicating non-programming content breaks, program start, program end, and graphic overlays to be included in the plurality of live input streams 128a, . . . , 128n when the plurality of disparate live media output streams are generated. In accordance with an embodiment, the plurality of indicators may also include overlay tags, for example a network logo, to be inserted into the plurality of disparate live media output streams that may not be associated with corresponding media content. Such generated programming schedule 111 may be provided various other systems, such as the indexing and storage system 116, the stream publishing engine 114, the stream selection service 142, and the program guide service 140.

At 506B, it may be determined that which disparate live media output streams should be joined, based on user selection on a desired disparate live media output stream. In accordance with another embodiment, upon receiving a request from a client device, such as the first client device 132a, the stream selection service 142 may be configured to determine which of a plurality of disparate live media output streams should be joined, based at least on a geographical location of the client device, consumer preferences, and service level. The stream selection service 142 may be configured to access the program guide service 140 service to present a list of available disparate live media output streams and programming content published for each disparate live media output stream. Based on the selection provided by user, such as 134a, associated with the client device, such as the first client device 132a, the programming schedule 111 may be updated and provided to the stream publishing engine 114. The stream selection service 142 may be configured to access a Geo location service 136 that may map, for example, an IP address of a client, such as the first client device 132a, to a geolocation and test for usage of a virtual private network for enforcing regional blackouts on devices that do not support native collection and provision of the geolocation.

The stream selection service 142 may be configured to generate a repository of a plurality of client devices 132a, . . . , 132n, such as schedules, rights, and preferences database 146 and corresponding requested or preferred live media output streams. The repository may be generated based on one or more content parameters and a list of programming schedules for the plurality of disparate live media output streams. Examples of the one or more content parameters may correspond to one or more of genre, demographics, geographical location of the consumer device, a time of viewing, content rights, individual user preferences based on previous selections and consumer account data.

In other words, the stream selection service 142 may be configured to leverage the various rights and preferences databases along with the list of variant output stream schedules defined by the switch logic manager 112, to generate a repository of the plurality of client devices 132a, . . . , 132n, and corresponding preferred disparate live media output stream. For example, the stream selection service 142 may determine preferred disparate live media output stream of the first client device 132a based on a geographical location of the first client device 132a, retrieving stored individual user preferences (such as the first client device 132a prefers "Scouts team", or a candidate "John" over the "Scouts team", or the candidate "John" despite of the geographical location of the first client device 132a, a combination of various factors to meet both content rights restrictions (that result in blackouts) as well as user preferences, or a viewer account data in the case that some content may require additional service tiers for example, the first client device 132a is paying an extra fee to see all games for its favorite team.

Thus, upon receiving the request from the first client device 132a to join a channel for viewing a live stream, the stream selection service 142 may be configured to present a list of available disparate live media output streams and programming content published for each disparate live media output stream. In various embodiments, the list may be determined based on, for example, geographical location of the first client device 132a, regional contents rights, media content rights, regional consumer preferences, individual consumer preferences, individual consumer service subscription level data, and availability of multiple disparate live media output streams. The first user 134a at the first client device 132a may provide a selection on one of the presented plurality of disparate live media output streams. The stream selection service 142 may be configured to receive the selection of one of the presented plurality of disparate live media output streams and record the received selection in user preferences 150 for future reference.

At 508, the encoded and packaged plurality of live input streams 128a, . . . , 128n and associated plurality of live input stream manifests may be retrieved from the content delivery system 130. In accordance with an embodiment, the indexing and storage system 116 may be configured to retrieve the plurality of live input streams 128a, . . . , 128n from the content delivery system 130. The indexing and storage system 116 may be configured to index the plurality of live input stream manifests associated with encoded and packaged plurality of live input streams 128a, . . . , 128n enlisted in the programming schedule 111 generated by the switch logic manager 112. In accordance with an embodiment, the plurality of live input stream manifests may correspond to data sets that include playlists of reference addresses of corresponding plurality of live input streams 128a, . . . , 128n, information about the plurality of live input streams 128a, . . . , 128n, and one or more non-programming content, programming content or overlay indicators. The indexing by the indexing and storage system 116 may be as per the following sub-steps.

At 508A, the plurality of live input stream manifests, associated with the plurality of live input streams 128a, . . . , 128n enlisted in the programming schedule 111, may be ingested. In accordance with an embodiment, the indexing and storage system 116 may be configured to ingest the plurality of live input stream manifests associated with the plurality of live input streams 128a, . . . , 128n enlisted in the programming schedule 111. In accordance with an embodiment, a proprietary manifest format may be implemented between the plurality of live stream encoder/packagers 126a, . . . , 126n and the indexing and storage system 116 in case additional information is required to be communicated to the indexing and storage system 116, which is not traditionally communicated in a published manifest.

At 508B, a plurality of media segments from the plurality of live input stream manifests may be indexed. In accordance with an embodiment, the indexing and storage system 116 may be configured to index the plurality of media segments and various indicators from the plurality of live input stream manifests. In accordance with an embodiment, the plurality of media segments may be generated based on encoding and packaging status of the plurality of live input streams 128a, . . . , 128n, ingestion status of the plurality of live input streams 128a, . . . , 128n into the indexing and storage system 116, and availability of the plurality of live input streams 128a, . . . , 128n for immediate playout.

At 508C, the indexed plurality of media segments for each of the plurality of live input streams 128a, . . . , 128n may be maintained for a defined duration. In accordance with an embodiment, the indexing and storage system 116 may be configured to maintain the indexed plurality of media segments for each of the plurality of live input streams 128a, . . . , 128n for a defined duration.

At 508D, a data log of a plurality of indicators indicating non-programming content breaks, program start, program end, and graphic overlays included in the plurality of live input streams 128a, . . . , 128n may be stored. In accordance with an embodiment, the indexing and storage system 116 may be configured to store the data log of the plurality of indicators indicating non-programming content breaks, program start, program end, and graphic overlays included in the plurality of live input streams 128a, . . . , 128n based on the programming schedule 111.

At 508E, completion of the plurality of live input streams 128a, . . . , 128n may be validated so that the plurality of live input streams 128a, . . . , 128n are ready to be included in the generated disparate live media output stream. In accordance with an embodiment, the indexing and storage system 116 may be configured to validate the completion of the plurality of live input streams 128a, . . . , 128n so that the plurality of live input streams 128a, . . . , 128n may be included in the generated disparate live media output stream.

At 508F, an alert may be generated in case the validation of the completion of the plurality of live input streams 128a, . . . , 128n fails. In accordance with an embodiment, the indexing and storage system 116 may be configured to generate the alert in case the validation of the completion of the plurality of live input streams 128a, . . . , 128n fails. In such case, the indexing and storage system 116 may be configured to execute a corrective action before a scheduled switch time indicated in the programming schedule 111.

In this regard, the indexing of information of the plurality of live input streams 128a, . . . , 128n enlisted in the programming schedule 111 may include logging of all the media segments contained in the plurality of live input stream manifests (or playlists), and the plurality of indicators (for example all the tags or other markers indicating non-programming content indicators, program indicators, overlay indicators, credit locations, and the like) in the plurality of live input streams 128a, . . . , 128n. The indexing and storage system 116 may be configured to continuously index the media segments from each of the plurality of live input stream manifests associated with the plurality of live input streams 128a, . . . , 128n based on the interval on which the plurality of live input streams 128a, . . . , 128n are updated. The indexing and storage system 116 may be configured to maintain a content segment buffer for each of the plurality of live input streams 128a, . . . , 128n and the plurality of indicators for each of the plurality of live input streams 128a, . . . , 128n. Thus, any live input stream may be enabled to be joined back in the buffer at a program boundary (not at a live point) and also enabling program restart, if allowed based on content rights. The indexing and storage system 116 may support multiple manifest formats, that may include, but are not limited to HLS, DASH, and potentially a proprietary format in case information, not contained in a public format, is required to be communicated.

At 510, the programming schedule 111 for the channel may be received from the switch logic manager 112. In accordance with an embodiment, the stream publishing engine 114 may be configured to receive the programming schedule 111 for the channel from the switch logic manager 112. The programming schedule 111 may be received based on a request from the first client device 132a to join a channel for viewing a live stream.

At 512, one or more events in a first live input stream manifest of the plurality of live input stream manifests may be identified. In accordance with an embodiment, the stream publishing engine 114 may be configured to identify one or more events in a first live input stream manifest of the plurality of live input stream manifests. In accordance with an embodiment, the first live input stream manifest may be associated with a first live input stream 128a of the plurality of live input streams 128a, . . . , 128n being viewed at a client device, for example the first client device 132a. The one or more events may correspond to a plurality of indicators in a first live input stream manifest or in-band indicators in the first live input stream 128a.

At 514, information related to a plurality of first media segments and the one or more events from the first live input stream 128a indicated in corresponding first live input stream manifest may be inserted into a disparate live output stream manifest based on the programming schedule 111. In accordance with an embodiment, based on the identification of the one or more events, the stream publishing engine 114 may be configured to insert the information related to a plurality of first media segments and the one or more events from the first live input stream 128a indicated in corresponding first live input stream manifest into the disparate live output stream manifest based on the programming schedule 111.

When the stream publishing engine 114 comes across tags or break points marking an ad break in the first live input stream manifest, the stream publishing engine 114 may insert such tags or break points in the disparate live output stream manifest based on the programming schedule 111.

In accordance with an embodiment, the stream publishing engine 114 may be further configured to insert one or more overlay indicators, which are independent of the first live input stream 128a, at defined time stamps in the generated disparate live media output stream based on the received programming schedule 111. In accordance with another embodiment, the stream publishing engine 114 may be further configured to support a plurality of digital rights management indicators in the first live input stream manifest. In accordance with another embodiment, the stream publishing engine 114 may be further configured to include one or more of a program start, a program end, content or context change indicator, a break indicator, an overlay indicator in the generated disparate live media output stream based on one or more events in the first live input stream manifest, and the received programming schedule 111.

In one embodiment, when an event of the one or more events corresponds to an indicator marking a first non-programming content break within the first live input stream manifest or an end of the first live input stream manifest, the stream publishing engine 114 may be configured to insert the first non-programming content break corresponding to the indicator in the disparate live media output stream manifest based on the programming schedule 111. The stream publishing engine 114 may be configured to access an updated programming schedule 111 to determine new indicator locations that are not included in the first live input stream manifest. In other words, the stream publishing engine 114 may communicate directly with the switch logic manager 112 to determine new tag locations that may not have been included in the first live input stream manifest.

The stream publishing engine 114 may be configured to insert a pre-encoded place holder content segment for the scheduled duration of the first non-programming content break as defined by the received programming schedule 111. In this regard, when the stream publishing engine 114 comes across tags marking an ad break (or a switch point) within the first live input stream manifest, the stream publishing engine 114 may insert an ad break tag in the disparate live media output stream manifest and stitch in the first pre-encoded slate content segments for the scheduled duration of the ad break as defined by the programming schedule 111.

In accordance with another embodiment, when an event of the one or more events corresponds to at least a credit or an overlay indicator, within the first live media steam manifest, the stream publishing engine 114 may be configured to insert the credit or the overlay indicators in the disparate live media output stream manifest as defined by the received programming schedule 111. In this regard, when the stream publishing engine 114 comes across credit or overlay tags, in the scheduled first live media steam manifest, the stream publishing engine 114 may insert such indicators into the generated disparate live media output stream manifest as defined by the programming schedule 111. Alternatively or additionally, the stream publishing engine 114 may be configured to receive instructions from the programming schedule 111 to insert certain overlay tags at certain times in the generated disparate live media output stream in case such indicators are not specific to the first and/or the second live input streams, such as a network logo.

At 516, a disparate live media output stream manifest may be generated. In accordance with an embodiment, the stream publishing engine 114 may be further configured to generate the disparate live media output stream, based on the insertion of the information related to the media segments from the first live input stream 128a indicated in the first live input media manifest. The first disparate live media output stream manifest may correspond to a data set that includes playlists including the first live input stream 128a, information about the first live input stream 128a, one or more overlay opportunities, and duration of a set of non-programming content breaks within the first live input stream 128a. The generated first disparate live media output stream manifest is in a state eligible for media distribution on the one or more of the plurality of client devices, such as the client devices 132a, . . . , 132n, via the content delivery system 130. In accordance with an embodiment, a first disparate live media output stream, corresponding to the live stream requested and to be viewed by the client device, such as the first client device 132a, may be generated for the channel via the media player based on the disparate live media output stream manifest.

At 518, the first live input stream 128a may be transitioned, by a first transition, based on insertion of plurality of first media segments indicated in first live input stream manifest to first disparate live output stream manifest, and one or more events in first live input stream and other live input streams. In accordance with an embodiment, the stream publishing engine 114 may be configured to transition, by the first transition of the first live input stream 128a, based on the insertion of the plurality of first media segments indicated in the first live input stream manifest to the first disparate live output stream manifest, and media content corresponding to the one or more events in the first live input stream 128a and other live input streams. The one or more events may correspond to indicators in the first live input stream manifest or in-band indicators in the first live input stream 128a and other live input streams.

In this regard, at the schedule time, the stream publishing engine 114 may be configured to switch the first live input stream 128a to the first disparate live media output stream, by inserting plurality of media segments from the first live input stream manifest for the first live input stream 128a into the first disparate live media output stream manifest. For certain protocols, an indicator, such as an in-band trigger, may be required in the first live input stream 128a to instruct the media player at the first client device 132a to check the first disparate live media output stream manifest for a switch or a change. It may include correct handling of various transitions between streams according to preferences of the stream owner/operator 144, as defined by the switch logic manager 112. It may further include insertion of additional information in the first disparate live media output stream manifest to facilitate the media player to transition smoothly between the pluralities of media segments from different live input media streams, as described below at 520, including, but are not limited to, discontinuity tags.

In accordance with an embodiment, a media player on the client device, such as the first client device 132a, may be configured to generate the first disparate live media output stream for viewing by the first client device 132a. Upon joining the first disparate live media output stream, the client device, such as the first client device 132a, may view the first disparate live media output stream.

While generating the first disparate live media output stream based on the first disparate live media output stream manifest, the media player on the client device, such as the first client device 132a, may determine the one or more events in the first disparate live media output stream manifest. Based on the type of event, the media player may be configured to perform the steps, as discussed above in step 512. Thus, according to the first switching schedule 111a for each of the plurality of disparate live media output streams, transition, by a first transition of the first live input stream 128a in the first disparate live media output stream, based on the one or more events.

At 520, information related to a plurality of second media segments and one or more events from a second live input stream indicated in a second live input stream manifest may be inserted into the first disparate live output stream manifest based on the updated programming schedule 111. The insertion may be in compliance with any requirements for blackout and/or local preferences within the region corresponding to geolocation of the consumer device (such as the first consumer device 110a). In such cases, the stream publishing engine 114 may be configured to insert information related to the plurality of second media segments and one or more events from the second live input stream 128b indicated in the second live input stream manifest into the first disparate live output stream manifest based on an updated programming schedule 111.

In various embodiments, the programming schedule 111 may be updated based on various parameters. For example, the programming schedule 111 may be updated based on the identification of the one or more events in the first live input stream 128a, interaction of the first user 134a with the one or more events, a geographical location of the first client device 132a, consumer preferences, and service level. Thus, the first switching schedule 111a in the updated programming schedule 111 (for the first disparate live output stream manifest) may define both the first transition and the second transition corresponding to at least switching between the first live input stream 128a, the second live input stream 128b, and the first disparate live media output stream at scheduled time stamps.

At 522, the second live input stream 128b may be transitioned, by a second transition, based on the insertion of the plurality of second media segments indicated in the second live input stream manifest to the first disparate live output stream manifest, and one or more events in second live input stream and other live input streams. In accordance with an embodiment, the stream publishing engine 114 may be configured to transition, by the second transition of the second live input stream 128b, based on the insertion of the plurality of second media segments indicated in the second live input stream manifest to the first disparate live output stream manifest, and media content corresponding to the one or more events in the second live input stream 128b and other live input streams.

In accordance with an embodiment, for the second transition, the first switching schedule 111a may define a switching at a scheduled time. In other embodiments, for the second transition, the first switching schedule 111a may define a first transition window and switch after program end message in the first live input stream 128a, define a second transition window and switch only after a program start message on the second live input stream 128b, or defining a third transition window and switch after the program end message on the first live input stream 128a and insert the second live input stream 124b at a program start message.

In accordance with an embodiment, the stream publishing engine 114 may be configured to remain on the first live input stream 128a until the stream publishing engine 114 is instructed by the updated programming schedule 111 to switch to the second live input stream 128b. In this regard, based on the updated programming schedule 111, the stream publishing engine 114 may be configured to switch from the first live input stream 128a to the second live input stream 128b.

The media player may switch, based on the updated first disparate live output stream manifest, between the plurality of live input stream manifests corresponding to at least first live input stream 128a and the second live input stream 124b, and accordingly, the first user 134a may view corresponding updated first disparate live media output stream at the first client device 132a. The disparate live media output streams, such as the first disparate live media output stream and the updated first disparate live media output stream, may be distributed based on a profile of the first client device 132a. The profile of the first client device 132a may be based on a resolution or a bitrate of client device 132a. Further, such disparate live media output streams are in a suitable state for distribution on the first client device 132a and are independent of a requirement to re-process, for example, re-encode and re-package, the plurality of live input streams 128a, . . . , 128n for the distribution to the plurality of client devices 132a, . . . , 132n.

Figure 6:
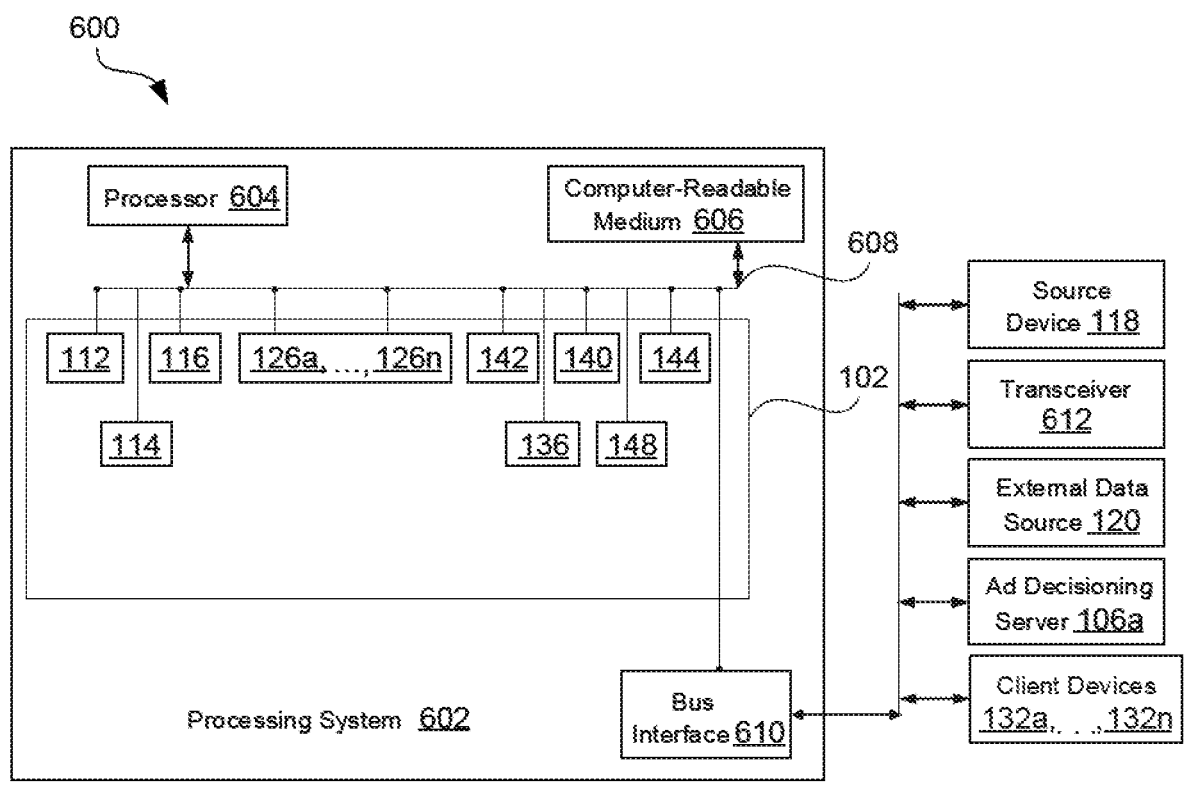
FIG. 6 is a conceptual diagram illustrating an example of a hardware implementation for a live media content switching system employing a processing system for publishing disparate live media output streams, in accordance with an exemplary embodiment of the disclosure.

FIG. 6 is a conceptual diagram illustrating an example of a hardware implementation for a content packaging and distribution system employing a processing system for publishing a disparate live media output stream using live input streams, in accordance with an exemplary embodiment of the disclosure. Referring to FIG. 6, the hardware implementation shown by a representation 600 for the live media content switching system 102 employs a processing system 602 for publishing a disparate live media output stream using the plurality of live input streams 128a, . . . , 128n, in accordance with an exemplary embodiment of the disclosure, as described herein.

In some examples, the processing system 602 may comprise one or more hardware processors 604, a non-transitory computer-readable medium 606, a bus 608, a bus interface 610, and a transceiver 612. FIG. 6 further illustrates the switch logic manager 112, the stream publishing engine 114, the indexing and storage system 116, the stream selection service 142, and the plurality of live stream encoder/packagers 126a, . . . , 126n, as described in detail in FIGS. 1A and 1B. FIG. 6 further illustrates the Geo location service 136, the program guide service 140, the stream owner/operator 144, and the schedules, rights, and preferences database 146, as described in detail in FIGS. 1A and 1B.

The hardware processor 604 may be configured to manage the bus 608 and general processing, including the execution of a set of instructions stored on the computer-readable medium 606. The set of instructions, when executed by the processor 604, causes the live media content switching system 102 to execute the various functions described herein for any particular apparatus. The hardware processor 604 may be implemented, based on a number of processor technologies known in the art. Examples of the hardware processor 604 may be a Reduced Instruction Set Computing (RISC) processor, an Application-Specific Integrated Circuit (ASIC) processor, a Complex Instruction Set Computing (CISC) processor, and/or other processors or control circuits.

The non-transitory computer-readable medium 606 may be used for storing data that is manipulated by the processor 604 when executing the set of instructions. The data is stored for short periods or in the presence of power. The computer-readable medium 606 may also be configured to store data for one or more of the switch logic manager 112, the stream publishing engine 114, the indexing and storage system 116, the stream selection service 142, the plurality of live stream encoder/packagers 126a, . . . , 126n, the Geo location service 136, the program guide service 140, the stream owner/operator 144, and the schedules, rights, and preferences database 146.

The bus 608 is configured to link together various circuits. In this example, the live media content switching system 102 employing the processing system 602 and the non-transitory computer-readable medium 606 may be implemented with bus architecture, represented generally by bus 608. The bus 608 may include any number of interconnecting buses and bridges depending on the specific implementation of the live media content switching system 102 and the overall design constraints. The bus interface 610 may be configured to provide an interface between the bus 608 and other circuits, such as, transceiver 612, and external devices, such as source device 118, external data source 120, and client devices 132a, . . . , 132n.

The transceiver 612 may be configured to provide a communication of the live media content switching system 102 with various other apparatus, such as the Ad decisioning servers 106a, . . . , 106n, the consumer devices 110a, . . . , 110n, such as the client devices 132a, . . . , 132n, the external data source 120, and the source device 118, via the network 108. The transceiver 612 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), and/or Wi-MAX.

It should be recognized that, in some embodiments of the disclosure, one or more components of FIG. 6 may include software whose corresponding code may be executed by at least one processor, for across multiple processing environments. For example, the switch logic manager 112, the stream publishing engine 114, the indexing and storage system 116, the stream selection service 142, the plurality of live stream encoder/packagers 126a, . . . , 126n, the Geo location service 136, the program guide service 140, the stream owner/operator 144, and the schedules, rights, and preferences database 146 may include software that may be executed across a single or multiple processing environments.

In an aspect of the disclosure, the processor 604, the computer-readable medium 606, or a combination of both may be configured or otherwise specially programmed to execute the operations or functionality of the switch logic manager 112, the hardware stream publishing engine 114, the indexing and storage system 116, the stream selection service 142, the plurality of live stream encoder/packagers 126a, . . . , 126n, the Geo location service 136, the program guide service 140, the stream owner/operator 144, and the schedules, rights, and preferences database 146, or various other components described herein, as described with respect to FIGS. 1A to 5B.

Various embodiments of the disclosure comprise a live media content switching system 102 that may be configured to generate a plurality of disparate live media output streams to be viewed on a plurality of consumer devices (such as the consumer devices 110a, . . . , 110n). The live media content switching system 102 may comprise, for example, the switch logic manager 112, the stream publishing engine 114, the indexing and storage system 116, the stream selection service 142, the plurality of live stream encoder/packagers 126a, . . . , 126n, the Geo location service 136, the program guide service 140, the stream owner/operator 144, and the schedules, rights, and preferences database 146. The indexing and storage system 116 may receive the plurality of live input streams 128a, . . . , 128n associated with a plurality of live input stream manifests. One or more events in a first live input stream manifest of the plurality of live input stream manifests may be identified by the stream publishing engine 114. The first live input stream manifest may be associated with the first live input stream 128a of the plurality of live input streams 128a, . . . , 128n being viewed at a consumer device, such as the first client device 132a. Based on the identification, the stream publishing engine 114 may insert information related to a plurality of first media segments and the one or more events from the first live input stream 128a indicated in a first live input stream manifest into a first disparate live media output stream manifest based on the programming schedule 111. The stream publishing engine 114 may publish the first disparate live media output stream of a plurality of disparate live media output streams for the first client device 132a based on the first live input stream manifest.

In accordance with an embodiment, the plurality of disparate live media output streams may be generated based on encoding and packaging of the plurality of live input streams 128a, . . . , 128n received from a plurality of source devices, such as source device 118. The plurality of live input stream manifests may be ingested into the indexing and storage system indexing and storage system 116. The indexing and storage system 116 may index media segments indicated in the ingested plurality of live input stream manifests, maintain the indexed media segments for each of the plurality of live input streams 128a, . . . , 128n in the indexing and storage system 116 for a defined duration. The indexing and storage system 116 may further generate a log of a plurality of indicators included in the plurality of live input streams 128a, . . . , 128n in the indexing and storage system 116. The plurality of indicators may correspond to non-programming content breaks, program start, program end, and graphic overlays, and validate the plurality of live input streams 128a, . . . , 128n for inclusion in the plurality of disparate live media output streams.

In accordance with an embodiment, the programming schedule 111 for the plurality of disparate live media output streams may be generated based on a plurality of live input stream schedules, a plurality of rights and preferences, data provided by a stream operator for the plurality of disparate live media output streams, and one or more content parameters. The data provided by the stream operator may indicate one or more transitions between the plurality of live input streams 128a, . . . , 128n and the first disparate live media output stream. The one or more content parameters may correspond to regional rights, content rights, regional preferences, and/or consumer preferences.

In accordance with an embodiment, the switch logic manager 112 may determine a count of the plurality of disparate live media output streams, based on one or more of the programming schedule, regional contents rights, media content rights, regional consumer preferences, individual consumer preferences, and individual consumer service subscription level data. The stream selection service 142 may be configured to generate a repository of the plurality of consumer devices 110a, . . . , 110n and corresponding preferred disparate live media output streams may be generated based on one or more content parameters and a list of programming schedules for the plurality of disparate live media output streams. The one or more content parameters may further correspond to one or more of genre, demographics, geographical location of the consumer device, a time of viewing, content rights, individual user preferences based on previous selections and consumer account data.

In accordance with an embodiment, the stream selection service 142 may present the plurality of available disparate live media output streams on the consumer devices 110a, . . . , 110n, based on one or more of geographical location of the consumer devices 110a, . . . , 110n, regional contents rights, media content rights, regional consumer preferences, individual consumer preferences, individual consumer service subscription level data, and availability of multiple disparate live media output streams. The stream selection service 142 may further receive a selection from the consumer device corresponding to one of the presented plurality of disparate live media output streams. The stream selection service 142 may further record the received selection of one of the presented plurality of disparate live media output streams in a user preferences repository.

In accordance with an embodiment, the stream publishing engine 114 may transition, by the first transition of the first live input stream, based on the insertion of the plurality of first media segments indicated in the first live input stream manifest to the first disparate live output stream manifest and the one or more events. The one or more events may correspond to indicators in the first live input stream manifest or in-band indicators in the first live input stream. Based on the identification of the one or more events in the first live input stream, information related to a plurality of second media segments and one or more events from a second live input stream indicated in a second live input stream manifest may be inserted into the first disparate live output stream manifest, based on an updated programming schedule.

The stream publishing engine 114 may further transition, by the second transition of the second live input stream, based on the insertion of the plurality of second media segments indicated in the second live input stream manifest to the first disparate live output stream manifest and one or more events.

In accordance with an embodiment, the switch logic manager 112 may generate a switching schedule for each of the plurality of disparate live media output streams. A first switching schedule for the generated first disparate live media output stream may define the first transition and the second transition corresponding to at least switching between the first live input stream, the second live input stream, and the first disparate live media output stream at scheduled time stamps. The first switching schedule may be based on the programming schedule 111, defining a first transition window and switch after program end message in the first live input stream, define a second transition window and switch only after a program start message on the second live input stream, or defining a third transition window and switch after the program end message on the first live input stream and insert the second live input stream at a program start message.

In accordance with an embodiment, when an event of the one or more events corresponds to an indicator marking a first non-programming content break within the first live input stream manifest or an end of the first live input stream manifest, the stream publishing engine 114 may insert a first non-programming content break in the first disparate live media output stream manifest based on the programming schedule 111. Further, the stream publishing engine 114 may insert a pre-encoded place holder content segment for a scheduled duration of the first non-programming content break as defined by the programming schedule 111. When an event of the one or more events corresponds to at least a credit or an overlay indicator within the first live input stream manifest, the stream publishing engine 114 may insert the credit or the overlay indicator in the first disparate live media output stream manifest as defined by the programming schedule 111.

In accordance with an embodiment, the stream selection service 142 may receive a request from the first consumer device 110a and determine which of the plurality of disparate live media output streams should be joined, based at least on a geographical location of the consumer device, consumer preferences, and service level. Further, the stream selection service 142 may present the programming content currently being published on the first disparate live media output stream and next programming content.

In accordance with an embodiment, the first consumer device 110a may generate a request for retrieval of non-programming content to the non-programming content proxy server, such as the proxy server 138. The request may be generated when pre-encoded place holder content segments for a scheduled duration of one or more non-programming content breaks, as defined by the programming schedule 111, is encountered in the first disparate live media output stream manifest during media content playout by media player at the first consumer device 110a.

In accordance with an embodiment, the first disparate live media output stream manifest generated for the first consumer device 110a is based on a profile of the first consumer device 110a. The profile of the first consumer device 110a may be based on a resolution or a bitrate. The generated first disparate live media output stream manifest may be in a suitable state for distribution on the first consumer device 110a via the content delivery system 130. The first disparate live media output stream is independent of a requirement to re-encode and re-package the plurality of live input streams 128a, . . . , 128n for the distribution to a plurality of consumer devices 110a, . . . , 110n.

The one or more events may correspond to a non-programming content indicator, a programming content indicator, or an overlay indicator in the plurality of live input streams 128a, . . . , 128n. The one or more events included in each of the plurality of live input stream manifests may be inserted into the first disparate live media output stream manifest. Further, as-run data for each disparate live media output stream of the plurality of disparate live media output streams may be provided to the program guide service 140. The as-run data may indicate a timing deviation between the generated programming schedule 111 and the plurality of disparate live media output streams published in the content delivery system 130. A plurality of digital rights management indicators may be supported in the plurality of disparate live media output streams.

In accordance with an embodiment, the indexing and storage system 116 may index information listed in the plurality of live input stream manifests for the plurality of live input streams listed in the programming schedule 111, based on time intervals at which the plurality of live input streams are updated. Further, the indexing and storage system 116 may index a plurality of media segments and one or more events included in each of the plurality of live input streams.

In accordance with an embodiment, the stream selection service 142 may generate a recommendation for a preferred disparate live media output stream for a consumer device 110a based on one or more of regional contents rights, media content rights, regional consumer preferences, individual consumer preferences, and individual consumer service subscription level data. The plurality of disparate live media output streams may provide one or more consumers with zip code level media targeting, minimized event blackouts, support to simultaneous programming content based on consumer preferences, and coverage of complete programming content.

Various embodiments of the disclosure may provide a non-transitory computer-readable medium, such as the non-transitory computer-readable medium 606, having stored thereon, computer implemented instruction that when executed by the processor 604 causes the live media content switching system 102 to execute operations to generate a plurality of disparate live media output streams to be viewed on a plurality of consumer devices (such as the consumer devices 110a, . . . , 110n). The live media content switching system 102 may execute operations comprising receiving a plurality of live input streams, wherein the plurality of live input streams is associated with a plurality of live input stream manifests. The live media content switching system 102 may further execute operations comprising identifying one or more events in a first live input stream manifest of the plurality of live input stream manifests, wherein the first live input stream manifest is associated with a first live input stream of the plurality of live input streams being viewed at a consumer device. The live media content switching system 102 may further execute operations comprising inserting, based on the identification of the one or more events, information related to a plurality of first media segments and the one or more events from the first live input stream indicated in a first live input stream manifest into a live output stream manifest based on a programming schedule. The live media content switching system 102 may further execute operations comprising generating at least a first disparate live media output stream of a plurality of disparate live media output streams for the consumer device based on the plurality of live input stream manifests.

Currently, dedicated encoders, such as physical encoders, are used to encode each program stream before distribution or transmission (for example, before a distribution of a program stream of a channel). Such dedicated encoders are not only costly but also limit ability of a broadcast provider to swap or change content dynamically in a program stream as each content item needs to pass through such dedicated encoders for transmission. In other words, if any new content item is to be inserted in the program stream of channel that is to be distributed, that program stream then needs to be re-encoded again. This in turn increases re-work and requires installation of large infrastructures and resources to maintain uninterrupted content delivery for existing channel and limits the ability of the broadcast or network provider to change content in real time or near-real time. In accordance with the various embodiments of the present disclosure, the live media content switching system 102 provides the capability to dynamically schedule and manipulate manifest of a live input streams, and insert the programming and non-programming content in the existing live input stream streamed on a channel into a disparate live media output stream manifest to be directly delivered over a web distribution system (such as one or more delivery methods) to be viewed on one or more consumer devices 110a, . . . , 110n. The disparate live media output stream in which the new media item is inserted may not be required to pass through the dedicated encoders before delivery over the network 108, such as the content delivery system 130.

The switch logic manager 112, the stream publishing engine 114, the indexing and storage system 116, the stream selection service 142, the plurality of live stream encoder/packagers 126a, . . . , 126n, the Geo location service 136, the program guide service 140, the stream owner/operator 144, and the schedules, rights, and preferences database 146, in conjunction with each other, provide significant productivity and efficiency improvements since the process of generating disparate live media output streams for numerous consumer devices has been simplified as the generated disparate live media output streams are independent of a requirement to re-process, that is re-encode and re-package, various live media input streams for media distribution to the plurality of consumer devices in real time or near-real time. Thus, the network provider now can have the capability to not only provide live channel offerings in cost-effective manner but also provide enhanced viewer experience to increase their appeal in order to gain wider audience.

Various components, as described above in FIG. 1B, the live media content switching system 102 may be configured to dynamically schedule various media items, such as live media input streams, and manipulate the manifests for generating disparate live media output streams for a channel to be directly delivered over the network 108 to be viewed on one or more consumer devices 110a, . . . , 110n. A plurality of disparate live media output streams may be created utilizing less memory than would otherwise be required resulting in much faster processing time (faster computation time without sacrificing accuracy). This enables a faster or real time change of programming schedule and scheduling of selected live media input streams. The capability to quickly generate disparate live media output streams may free up valuable processing resources such as memory and computing power.

Further, the capability of the live media content switching system 102 to log user selection in an individual user preferences database to be used in an automated decision process to select the most appropriate content from that brand on a going forward basis makes the live media content switching system 102 more user friendly. Effectively, for example, in a specific geography, if there are "35" regional sports networks, the live media content switching system 102 may generate unlimited disparate live media output streams that may be able to serve way more than only "210" television markets. The reason for the generation of unlimited disparate live media output streams may be dynamic rule sets, live schedules, and user preferences in addition to geolocation-based criteria, based on which media content is switched to create unlimited disparate live media output streams. Furthermore, the live media content switching system 102 may be configured to determine which generated disparate live media output stream or traditional live stream individual client devices should join, or providing a filtered list of generated live stream options, provides an enhanced user experience.

The live media content switching system 102 and method leverages an understanding of how the modern web streaming protocols work, and accordingly generates multiple disparate live media output stream manifests that contain rights cleared content for each geographic location, as well as more appropriate content to a specific geographic locations or defined audience segments. This is done simply by manipulating the text-based live manifests from multiple live input streams to produce multiple disparate live media output stream manifests, which are delivered to standard media players on the client devices.

Further, because the media content itself does not need to be processed beyond the initial creation of the live input streams prepared for web distribution, the live media content switching system 102 and method is extremely inexpensive to provide the multiple disparate live media output streams. The live media content switching system 102 and method is based solely on the cost to manipulate the text-based manifests, which provide the instructions for the media players at the client devices to execute. The live media content switching system 102 and method also supports targeted ad insertion on a per client basis through the insertion of tags in the disparate live media output stream manifests and further leverage the processing power of the individual client devices to insert targeted channel graphics and overlay advertisements and promotions.

Further, the live media content switching system 102 provides the disparate live media output streams that a consumer device may join individually, based on a combination of geographical location, regional content rights, media content rights, regional user preferences, individual user preferences, and individual user service subscription level corresponding to different consumer devices. The live media content switching system 102 may be configured to present individual consumer devices a choice if at a certain switch point there are multiple options for disparate live media output streams that meet a selection criteria, based on a combination of a geographical location, regional content rights, media content rights, regional user preferences, individual user preferences, and individual user service subscription level data. Further, the live media content switching system 102 may be configured to log the user selection of the choice in the user preferences database so the decision can be used in determining the number of disparate live media output streams to be created and the consumer stream selection in the future, thereby making the system 100 more predictive.

As utilized herein the terms "circuits" and "circuitry" refer to physical electronic components (for example, hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for publishing disparate live media output streams using live input streams.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual servers or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
one or more processors in a live media content switching system, the one or more processors are configured to:
receive a plurality of live input streams, wherein the plurality of live input streams is associated with a plurality of live input stream manifests;
identify one or more events in a first live input stream manifest of the plurality of live input stream manifests,
wherein the first live input stream manifest is associated with a first live input stream of the plurality of live input streams being viewed at a consumer device;
insert, based on the identification of the one or more events, information related to a plurality of first media segments and the one or more events from the first live input stream into a first disparate live media output stream manifest, based on a programming schedule,
wherein the first live input stream is indicated in a first live input stream manifest of the plurality of live input stream manifests;
generate a first disparate live media output stream based on a switch between the first live input stream indicated in the first live input stream manifest from a first regional network and a second live input stream indicated in a second live input stream manifest from a second regional network at scheduled time stamps,
wherein the first live input stream and the second live input stream are switched based on a user interaction with the one or more events, and
wherein the first regional network is different from the second regional network; and
publish at least the first disparate live media output stream of a plurality of disparate live media output streams for the consumer device based on the first live input stream manifest.

2. The system according to claim 1,
wherein the generated first disparate live media output stream is published in a content delivery system for distribution to a plurality of consumer devices,
wherein the plurality of disparate live media output streams is generated based on the plurality of live input streams received from a plurality of source devices, and
wherein the plurality of live input streams is encoded and packaged.

3. The system according to claim 1,
wherein the plurality of live input stream manifests is ingested into an indexing and storage system, wherein the one or more processors are further configured to:
index media segments indicated in the ingested plurality of live input stream manifests;
maintain the indexed media segments for each of the plurality of live input streams in the indexing and storage system for a defined duration;
generate a log of a plurality of indicators included in the plurality of live input streams in the indexing and storage system,
wherein the plurality of indicators corresponds to at least one of non-programming content breaks, program start, program end, or graphic overlays; and
validate the plurality of live input streams for inclusion in the plurality of disparate live media output streams.

4. The system according to claim 1,
wherein the one or more processors are further configured to generate the programming schedule for the plurality of disparate live media output streams based on at least one of a plurality of live input stream schedules, a plurality of rights and preferences, data provided by a stream operator for the plurality of disparate live media output streams, or one or more content parameters,
wherein the data provided by the stream operator indicates one or more transitions between the plurality of live input streams and the first disparate live media output stream, and
wherein the one or more content parameters correspond to at least one of regional rights, content rights, regional preferences, or consumer preferences.

5. The system according to claim 4,
wherein the one or more processors are further configured to determine a count of the plurality of disparate live media output streams based on at least one of the programming schedule, regional contents rights, media content rights, regional consumer preferences, individual consumer preferences, or individual consumer service subscription level data.

6. The system according to claim 4,
wherein the one or more processors are further configured to generate a repository of consumer information and corresponding preferred disparate live media output stream based on one or more content parameters and a list of programming schedules for the plurality of disparate live media output, streams, and
wherein the one or more content parameters correspond to at least one of genre, demographics, geographical location of the consumer device, a time of viewing, content rights, individual user preferences based on previous selections or consumer account data.

7. The system according to claim 6,
wherein, based on one or more of geographical location of the consumer device, regional contents rights, media content rights, regional consumer preferences, individual consumer preferences, individual consumer service subscription level data, or availability of multiple disparate live media output streams, the one or more processors are further configured to:
present the plurality of disparate live media output streams on the consumer device;
receive a selection from the consumer device corresponding to one of the presented plurality of disparate live media output streams; and
record the received selection of one of the presented plurality of disparate live media output streams in a user preferences repository.

8. The system according to claim 1,
wherein the one or more processors are further configured to transition, by a first transition of the first live input stream, based on the insertion of the plurality of first media segments indicated in the first live input stream manifest to the first disparate live media output stream manifest and the one or more events,
wherein the one or more events correspond to indicators in the first live input stream manifest or in-band indicators in the first live input stream.

9. The system according to claim 8,
wherein, based on the identification of the one or more events in the first live input stream, the one or more processors are further configured to:
insert information related to a plurality of second media segments and one or more events from the second live input stream indicated in the second live input stream manifest into the first disparate live media output stream manifest based on an updated programming schedule; and transition, by a second transition of the second live input stream, based on the insertion of the plurality of second media segments indicated in the second live input stream manifest to the first disparate live media output stream manifest and one or more events.

10. The system according to claim 9,
wherein the one or more processors are further configured to:
generate a switching schedule for each of the plurality of disparate live media output streams,
wherein a first switching schedule for the generated first disparate live media output stream defines the first transition and the second transition corresponding to the switch between the first live input stream, the second live input stream, and the first disparate live media output stream at the scheduled time stamps, and
wherein the first switching schedule is based on the programming schedule, a defined first transition window and a first switch after a program end message in the first live input stream, a defined second transition window and a second switch after a program start message on the second live input stream, or a defined third transition window and a third switch after the program end message on the first live input stream; and
insert the second live input stream at the program start message.

11. The system according to claim 1,
wherein, based on an event of the one or more events that corresponds to an indicator that marks a first non-programming content break within the first live input stream manifest or an end of the first live input stream manifest, the one or more processors are further configured to:
insert a first non-programming content break corresponding to the indicator in the first disparate live media output stream manifest based on the programming schedule;
insert a pre-encoded place holder content segment for a scheduled duration of the first non-programming content break as defined by the programming schedule; and
insert at least a credit or an overlay indicator in the first disparate live media output stream manifest as defined by the programming schedule, based on an event of the one or more events that corresponds to at least the credit or the overlay indicator within the first live input stream manifest.

12. The system according to claim 1,
wherein the one or more processors are further configured to receive a request from the consumer device and determine a join of the plurality of disparate live media output streams,
wherein the plurality of disparate live media output streams are joined based at least on a geographical location of the consumer device, consumer preferences, or service level.

13. The system according to claim 1,
wherein the one or more processors are further configured to present programming content currently published on the first disparate live media output stream and next programming content.

14. The system according to claim 1,
wherein a request for retrieval of non-programming content is generated by the consumer device to a non-programming content proxy server based on pre-encoded place holder content segments for a scheduled duration of one or more non-programming content breaks, and
wherein the pre-encoded place holder content segments as defined by the programming schedule is encountered in the first disparate live media output stream manifest during media content playout by media player at the consumer device.

15. The system according to claim 1,
wherein the first disparate live media output stream manifest generated for the consumer device is based on a profile of the consumer device, and
wherein the profile of the consumer device is based on a resolution or a bitrate.

16. The system according to claim 1,
wherein the generated first disparate live media output stream manifest is in a suitable state for distribution on the consumer device via a content delivery network, and
wherein the first disparate live media output stream is independent to re-encode and re-package the plurality of live input streams for the distribution to a plurality of consumer devices.

17. The system according to claim 1,
wherein the one or more events correspond to at least on of a non-programming content indicator, a programming content indicator, or an overlay indicator in the plurality of live input streams.

18. The system according to claim 1,
wherein the one or more processors are further configured to insert the one or more events included in each of the plurality of live input stream manifests into the first disparate live media output stream manifest.

19. The system according to claim 1,
wherein the one or more processors are configured to provide as-run data for each disparate live media output stream of the plurality of disparate live media output streams to a program guide service, and
wherein the as-run data indicates a timing deviation between a generated programming schedule and the plurality of disparate live media output streams published in a content delivery system.

20. The system according to claim 1,
wherein the one or more processors are further configured to support a plurality of digital rights management indicators in the plurality of disparate live media output streams.

21. The system according to claim 1,
wherein the one or more processors are further configured to:
index information listed in the plurality of live input stream manifests for the plurality of live input streams listed in the programming schedule,
wherein the information listed in the plurality of live input stream manifests is indexed based on time intervals at which the plurality of live input streams are updated;
index a plurality of media segments and one or more events included in each of the plurality of live input streams; and
validate the plurality of live input streams for inclusion in the plurality of disparate live media output streams.

22. The system according to claim 1,
wherein the one or more processors are further configured to generate a recommendation for a preferred disparate live media output stream for a consumer based on at least one of regional contents rights, media content rights; regional consumer preferences, individual consumer preferences, or individual consumer service subscription level data.

23. The system according to claim 1, wherein the plurality of disparate live media output streams provides one or more consumers with zip code level media targeting, minimized event blackouts, support to simultaneous programming content based on consumer preferences, and coverage of complete programing content.

24. A method, comprising:
in a live media content switching system:
receiving a plurality of live input streams, wherein the plurality of live input streams is associated with a plurality of live input stream manifests;
identifying one or more events in a first live input stream manifest of the plurality of live input stream manifests,
wherein the first live input stream manifest is associated with a first live input stream of the plurality of live input streams being viewed at a consumer device;
inserting, based on the identification of the one or more events, information related to a plurality of first media segments and the one or more events from the first live input stream into a live output stream manifest, based on a programming schedule,
wherein the first live input stream is indicated in a first live input stream manifest of the plurality of live input stream manifests;
generating a first disparate live media output stream based on a switching between the first live input stream indicated in the first live input stream manifest from a first regional network and a second live input stream indicated in a second live input stream manifest from a second regional network at scheduled time stamps,
wherein the first live input stream and the second live input stream are switched based on a user interaction with the one or more events, and
wherein the first regional network is different from the second regional network; and
publishing at least the first disparate live media output stream of a plurality of disparate live media output streams for the consumer device based on the plurality of live input stream manifests.

25. The method according to claim 24, further comprising:
wherein the generated first disparate live media output stream is published in a content delivery system for distribution to a plurality of consumer devices, and
wherein the plurality of disparate live media output streams are generated based on encoding and packaging of the plurality of live input streams received from a plurality of source devices.

26. The method according to claim 24, further comprising:
indexing media segments indicated in ingested plurality of live input stream manifests, wherein the plurality of live input stream manifests is ingested into an indexing and storage system;
maintaining the indexed media segments for each of the plurality of live input streams in the indexing and storage system for a defined duration;
generating a log of a plurality of indicators included in the plurality of live input streams in the indexing and storage system, wherein the plurality of indicators correspond to non-programming content breaks, program start, program end, and graphic overlays; and
validating the plurality of live input streams for inclusion in the plurality of disparate live media output streams.

27. The method according to claim 24, further comprising generating the programming schedule for the plurality of disparate live media output streams based on at least one of a plurality of live input stream schedules, a plurality of rights and preferences, data provided by a stream operator for the plurality of disparate live media output streams, or one or more content parameters,
wherein the data provided by the stream operator indicates one or more transitions between the plurality of live input streams and the first disparate live media output stream,
wherein the one or more content parameters correspond to at least one of regional rights, content rights, regional preferences, or consumer preferences.

28. The method according to claim 27, further comprising determining a count of the plurality of disparate live media output streams based on at least one of the programming schedule, regional contents rights, media content rights, regional consumer preferences, individual consumer preferences, or individual consumer service subscription level data.

29. The method according to claim 27, further comprising generating a repository of consumer information and corresponding preferred disparate live media output stream based on one or more content parameters and a list of programming schedules for the plurality of disparate live media output streams,
wherein the one or more content parameters correspond to at least one of genre, demographics, geographical location of the consumer device, a time of viewing, content rights, individual user preferences based on previous selections or consumer account data.

30. The method according to claim 29, further comprising:
presenting the plurality of disparate live media output streams on the consumer device;
receiving a selection from the consumer device corresponding to one of the presented plurality of disparate live media output streams; and
recording the received selection of one of the presented plurality of disparate live media output streams in a user preferences repository.

31. The method according to claim 24, further comprising transitioning, by a first transition of the first live input stream, based on the insertion of the plurality of first media segments indicated in the first live input stream manifest to the first disparate live media output stream manifest and the one or more events, wherein the one or more events correspond to indicators in the first live input stream manifest or in-band indicators in the first live input stream.

32. The method according to claim 31, further comprising:
inserting information related to a plurality of second media segments and one or more events from the second live input stream indicated in the second live input stream manifest into the first disparate live media output stream manifest based on the programming schedule; and
transitioning, by a second transition of the second live input stream, based on the insertion of the plurality of second media segments indicated in the second live input stream manifest to the disparate live media output stream manifest and one or more events.

33. The method according to claim 32, further comprising:
generating a switching schedule for each of the plurality of disparate live media output streams,
wherein a first switching schedule for the generated first disparate live media output stream defines the first transition and the second transition corresponding to the switching between the first live input stream, the second live input stream, and the first disparate live media output stream at the scheduled time stamps,
wherein the first switching schedule is based on the programming schedule, defining a first transition window and a first switch after a program end message in the first live input stream, define a second transition window and a second switch after a program start message on the second live input stream, or defining a third transition window and a third switch after the program end message on the first live input stream; and
insert the second live input stream at a program start message.

34. The method according to claim 24, based on an event of the one or more events that corresponds to an indicator marking a first non-programming content break within the first live input stream manifest or an end of the first live input stream manifest, further comprising:
inserting a first non-programming content break corresponding to the indicator in the first disparate live media output stream manifest based on the programming schedule; and
inserting a pre-encoded place holder content segment for a scheduled duration of the first non-programming content break as defined by the programming schedule; and
inserting at least a credit or an overlay indicator in the first disparate live media output stream manifest as defined by the programming schedule, based on an event of the one or more events that corresponds to at least the credit or the overlay indicator within the first live input stream manifest.

35. The method according to claim 24, further comprising receiving a request from the consumer device and determine a join of the plurality of disparate live media output streams,
wherein the plurality of disparate live media output streams are joined based at least on a geographical location of the consumer device, consumer preferences, or service level.

36. The method according to claim 24, further comprising presenting programming content currently published on the first disparate live media output stream and next programing content.

37. The method according to claim 24, further comprising inserting the one or more events included in each of the plurality of live input stream manifests into the first disparate live media output stream manifest.

38. The method according to claim 24, further comprising providing as-run data for each live output stream of the plurality of disparate live media output streams to a program guide service,
wherein the as-run data indicates a timing deviation between a generated programming schedule and the plurality of disparate live media output streams published in a content delivery system.

39. The method according to claim 24, further, comprising supporting a plurality of digital rights management indicators in the plurality of disparate live media output streams.

40. The method according to claim 24, further comprising:
indexing information listed in the plurality of live input stream manifests for the plurality of live input streams listed in the programming schedule,
wherein the information listed in the plurality of live input stream, manifests is indexed based on time intervals at which the plurality of live input streams are updated; and
indexing a plurality of media segments and one or more events included in each of the plurality of live input streams.

41. The method according to claim 24, further comprising generating a recommendation for a preferred disparate live media output stream for a consumer based on at least one of regional contents rights, media content rights, regional consumer preferences, individual consumer preferences, or individual consumer service subscription level data.

42. A non-transitory computer-readable medium having stored thereon, computer implemented instructions that when executed by a processor in a computer, causes the computer to execute operations, the operations comprising:
in a live media content switching system:
receiving a plurality of live input streams, wherein the plurality of live input streams is associated with a plurality of live input stream manifests;
identifying one or more events in a first live input stream manifest of the plurality of live input stream manifests,
wherein the first live input stream manifest is associated with a first live input stream of the plurality of live input streams being viewed at a consumer device;
inserting, based on the identification of the one or more events, information related to a plurality of first media segments and the one or more events from the first live input stream into a live output stream manifest, based on a programming schedule,
wherein the first live input stream is indicated in a first live input stream manifest of the plurality of live input stream manifests;
generating a first disparate live media output stream manifest based on a switching between the first live input stream indicated in the first live input stream manifest from a first regional network and a second live input stream indicated in a second live input stream manifest from a second regional network at scheduled time stamps,
wherein the first live input stream and the second live input stream are switched based on a user interaction with the one or more events, and
wherein the first regional network is different from the second regional network; and
publishing at least the first disparate live media output stream of a plurality of disparate live media output streams for the consumer device based on the plurality of live input stream manifests.

43. The system according to claim 1, wherein the first live input stream and the second live input stream are switched based on a user interaction with the one or more events.

44. The method according to claim 24, wherein the switching between the first live input stream and the second live input stream is based on a user interaction with the one or more events.

45. The non-transitory computer-readable medium according to claim 42, wherein the first live input stream and the second live input stream are switched based on a user interaction with the one or more events.

* * * * *